US008550644B2

(12) United States Patent
Kuromizu

(10) Patent No.: US 8,550,644 B2
(45) Date of Patent: Oct. 8, 2013

(54) LIGHTING DEVICE, DISPLAY DEVICE AND TELEVISION RECEIVER

(75) Inventor: Yasumori Kuromizu, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 191 days.

(21) Appl. No.: 13/321,561

(22) PCT Filed: Mar. 12, 2010

(86) PCT No.: PCT/JP2010/054196
§ 371 (c)(1),
(2), (4) Date: Nov. 21, 2011

(87) PCT Pub. No.: WO2010/140414
PCT Pub. Date: Dec. 9, 2010

(65) Prior Publication Data
US 2012/0069250 A1    Mar. 22, 2012

(30) Foreign Application Priority Data

Jun. 3, 2009    (JP) .................................. 2009-134211

(51) Int. Cl.
*G09F 13/04*    (2006.01)
*F21V 9/00*    (2006.01)

(52) U.S. Cl.
USPC ..................... 362/97.1; 362/296.01; 362/293; 362/217.05

(58) Field of Classification Search
None
See application file for complete search history.

(56) References Cited

U.S. PATENT DOCUMENTS

| 7,185,995 | B2 * | 3/2007 | Hatanaka et al. ............... 362/29 |
| 7,318,664 | B2 * | 1/2008 | Hatanaka et al. ............. 362/555 |
| 7,726,828 | B2 * | 6/2010 | Sato ............................. 362/97.3 |
| 7,819,542 | B2 * | 10/2010 | Sato ............................. 362/97.1 |
| 7,990,499 | B2 * | 8/2011 | Ito et al. ........................ 349/108 |
| 2006/0215386 | A1 | 9/2006 | Hatanaka et al. |
| 2007/0086181 | A1 | 4/2007 | Hatanaka et al. |
| 2009/0003002 | A1 | 1/2009 | Sato |

(Continued)

FOREIGN PATENT DOCUMENTS

| EP | 2 416 057 A1 | 2/2012 |
| JP | 08-029785 A | 2/1996 |

(Continued)

OTHER PUBLICATIONS

Official Communication issued in corresponding European Patent Application No. 10783200.8, mailed on Feb. 17, 2012.

(Continued)

*Primary Examiner* — Natalie Walford
(74) *Attorney, Agent, or Firm* — Keating & Bennett, LLP

(57) ABSTRACT

A lighting device achieves power saving and a moderate illumination brightness distribution without having local dark portions. A lighting device 12 includes a light source 17, a chassis 14 and an optical member 15a. The optical member 15a includes a light source overlapping portion DA that overlaps a light source installation area LA where the light source 17 is arranged. A light reflecting portion 50 is formed on at least the light source overlapping portion DA. The optical member 50 has maximum light reflectance Rmax and minimum light reflectance Rmin, and the maximum light reflectance Rmax is 40% or higher in the light source overlapping portion DA and an entire half-value width H having light reflectance of (Rmax+Rmin)/2 occupies 25% to 80% in a transmission area TA of the optical member 15a through which the light from the light source transmits.

21 Claims, 29 Drawing Sheets

(56) References Cited

U.S. PATENT DOCUMENTS

| | | |
|---|---|---|
| 2009/0015770 A1 | 1/2009 | Ito et al. |
| 2010/0061096 A1 | 3/2010 | Sato |
| 2011/0032452 A1 | 2/2011 | Takata |

FOREIGN PATENT DOCUMENTS

| | | |
|---|---|---|
| JP | 2002-022909 A | 1/2002 |
| JP | 2004-342587 A | 12/2004 |
| JP | 2005-117023 A | 4/2005 |
| JP | 2009-094087 A | 4/2009 |
| WO | 2009/133728 A1 | 11/2009 |
| WO | 2010/113363 A1 | 10/2010 |

OTHER PUBLICATIONS

Official Communication issued in International Patent Application No. PCT/JP2010/054196, mailed on Jun. 8, 2010.

Kuromizu, "Lighting Device, Display Device and Television Receiver", U.S. Appl. No. 13/319,554, filed Nov. 9, 2011.

\* cited by examiner

FIG.1
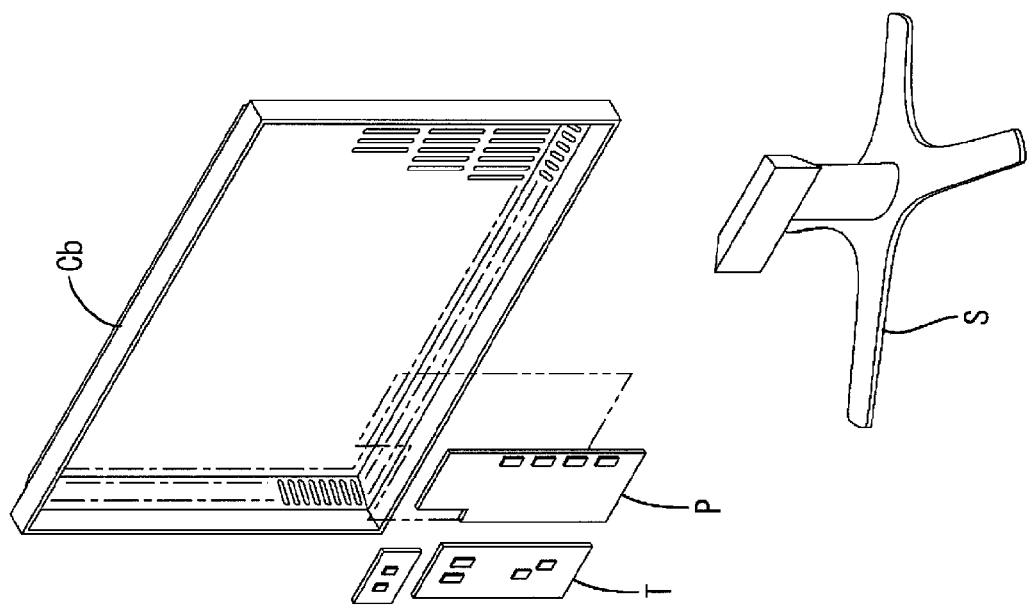
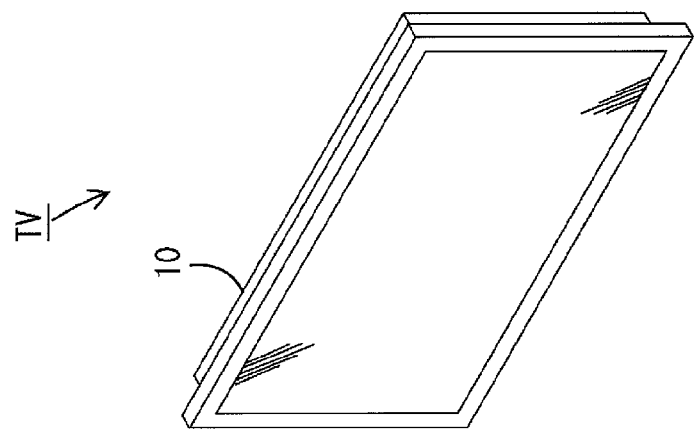
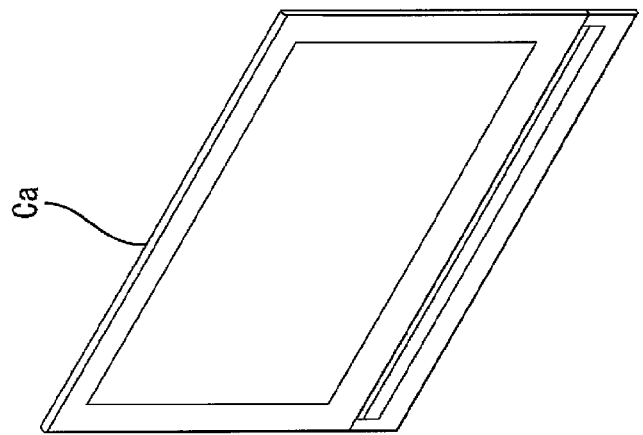

US 8,550,644 B2

LIGHTING DEVICE, DISPLAY DEVICE AND TELEVISION RECEIVER

TECHNICAL FIELD

The present invention relates to a lighting device, a display device and a television receiver.

BACKGROUND ART

A liquid crystal panel included in a liquid crystal display device does not emit light, and thus a backlight device is required as a separate lighting device. The backlight device is arranged behind the liquid crystal panel (i.e., on a side opposite from a display surface side). It includes a chassis having an opening on a liquid crystal panel side, a plurality of light sources (for example, cold cathode tubes) accommodated in the chassis as lamps, and an optical member (a diffuser plate and the like) provided at the opening of the chassis for efficiently directing light emitted from the light sources to a liquid crystal panel.

In such a backlight device including light sources emitting linear light, the optical member converts linear light into planer light to unify illumination light. However, if the linear light is not sufficiently converted into the planer light, striped lamp images are generated along the arrangement of the cold cathode tubes, and this deteriorates display quality of the liquid crystal display device.

To obtain uniform illumination light from the backlight device, it is desirable to increase the number of light sources and reduce a distance between the adjacent light sources or to increase a diffusion rate of a diffuser plate, for example. However, increase of the number of light sources increases a cost of the backlight device and also increases power consumption. Increase of the diffusion rate of the diffuser plate fails to improve brightness and causes the problem that the number of light sources is required to be increased. A backlight device disclosed in Patent Document 1 has been known as one that suppresses power consumption and ensures uniform brightness.

The backlight device described in Patent Document 1 includes a diffuser plate provided on a light output side of a plurality of light sources. A dimming dot pattern having a light transmission rate (opening rate) from 62% to 71% and haze from 90% to 99% is printed on the light diffuser plate. A dot diameter of each dot is great directly above the light sources and the dot diameter becomes smaller as is farther from the light sources. With such a configuration, the light emitted from the light sources is efficiently used and the backlight device irradiates light having a sufficient brightness value and uniform brightness without increasing power consumption of the light source.

[Patent Document 1] Japanese Unexamined Patent Publication No. 2005-117023

PROBLEM TO BE SOLVED BY THE INVENTION

In the device disclosed in Patent Document 1, to achieve further decrease of the consumption power, the number of light sources is desirably reduced. However, if the number of light sources is reduced with using the dimming dot pattern disclosed in Patent Document 1, local dark portions may be formed. The light reflectance of the diffuser and the arrangement of the dimming dot pattern are necessarily determined precisely according to the arrangement of the light sources so as not to form local dark portions.

DISCLOSURE OF THE PRESENT INVENTION

The present invention was made in view of the foregoing circumstances. An object of the present invention is to provide a lighting device that provides a moderate illumination brightness distribution with achieving power saving and without causing any local dark portions. Another object of the present invention is to provide a display device including such a lighting device and a television receiver including such a display device.

MEANS FOR SOLVING THE PROBLEM

To solve the above problem, a lighting device of the present invention includes a light source, a chassis configured to house the light source and have an opening for light from the light source to pass through, and an optical member provided to face the light source and cover the opening. The chassis includes a light source installation area in which the light source is arranged and an empty area in which no light source is arranged. The optical member includes a light source overlapping portion that overlaps the light source installation area and an empty area overlapping portion that overlaps the empty area. A light reflecting portion configured to reflect light from the light source is provided on at least the light source overlapping portion of the optical member. In a light reflectance distribution in a surface area of the optical member, the surface of the optical member has maximum light reflectance Rmax and minimum light reflectance Rmin, and the maximum light reflectance Rmax is 40% or higher in the light source overlapping portion and an entire half-value width H having light reflectance of (Rmax+Rmin)/2 occupies 25% to 80% in a transmission area of the optical member through which the light from the light source transmits.

With such a configuration, light output from the light source first reaches the light source overlapping portion of the optical member that is the portion having light reflecting portion. Therefore, most of the light reflects off the light source overlapping portion (does not pass through the light source overlapping portion), and the brightness of illumination light is suppressed with respect to the light emission amount from the light source. On the other hand, the light that reflects off the light source overlapping portion is further reflected in the chassis and the light reaches the empty area overlapping portion. Predetermined brightness of illumination light is achieved in the empty area overlapping portion. This achieves power saving without arranging a plurality of light sources and substantially a uniform brightness distribution is achieved in the lighting device.

If the maximum light reflectance Rmax in the light source overlapping portion is less than 40%, the amount of rays of light that is reflected by the light source overlapping portion is decreased, and this reduces the amount of rays of light that is reflected again in the chassis and reaches the empty area overlapping portion. Accordingly, the dark portions may be formed in the empty area overlapping portion. Therefore, the maximum light reflectance Rmax is set to 40% or higher, and the light emitted from the light source is effectively reflected by the light source overlapping portion and reaches the empty area overlapping portion. Accordingly, dark portions are less likely to be formed in the illumination area. In the light reflectance distribution of the diffuser, if the entire half-value width H having the light reflectance of (Rmax+Rmin)/2 occupies 25% or less in the width of the transmission area of the optical member, light emitted from the light source is locally reflected. This easily causes unevenness of the brightness distribution. Namely, the light source overlapping portion is relatively dark and the portions adjacent to the light source overlapping portion are relatively bright. On the other hand, if the entire half-value width H occupies 80% or more in the width of the transmission area, the area that reflects the light emitted from the light source is too large. This decreases the amount of rays of light that transmits through the entire optical member, and accordingly dark portions are likely to be formed in the edge portions of the optical member. The entire half-value width H having the light reflectance of (Rmax+Rmin)/2 occupies 25% to 80% in the width of the transmission area of the optical member, and this achieves a moderate illumination brightness distribution.

BRIEF DESCRIPTION OF THE DRAWINGS

FIG. 1 is an exploded perspective view illustrating a general construction of a television receiver according to a first embodiment of the present invention;

BEST MODE FOR CARRYING OUT THE INVENTION

First Embodiment

The first embodiment of the present invention will be explained with reference to FIGS. 1 to 12.

First, a construction of a television receiver TV including a liquid crystal display device 10 will be explained.

Figure 2:
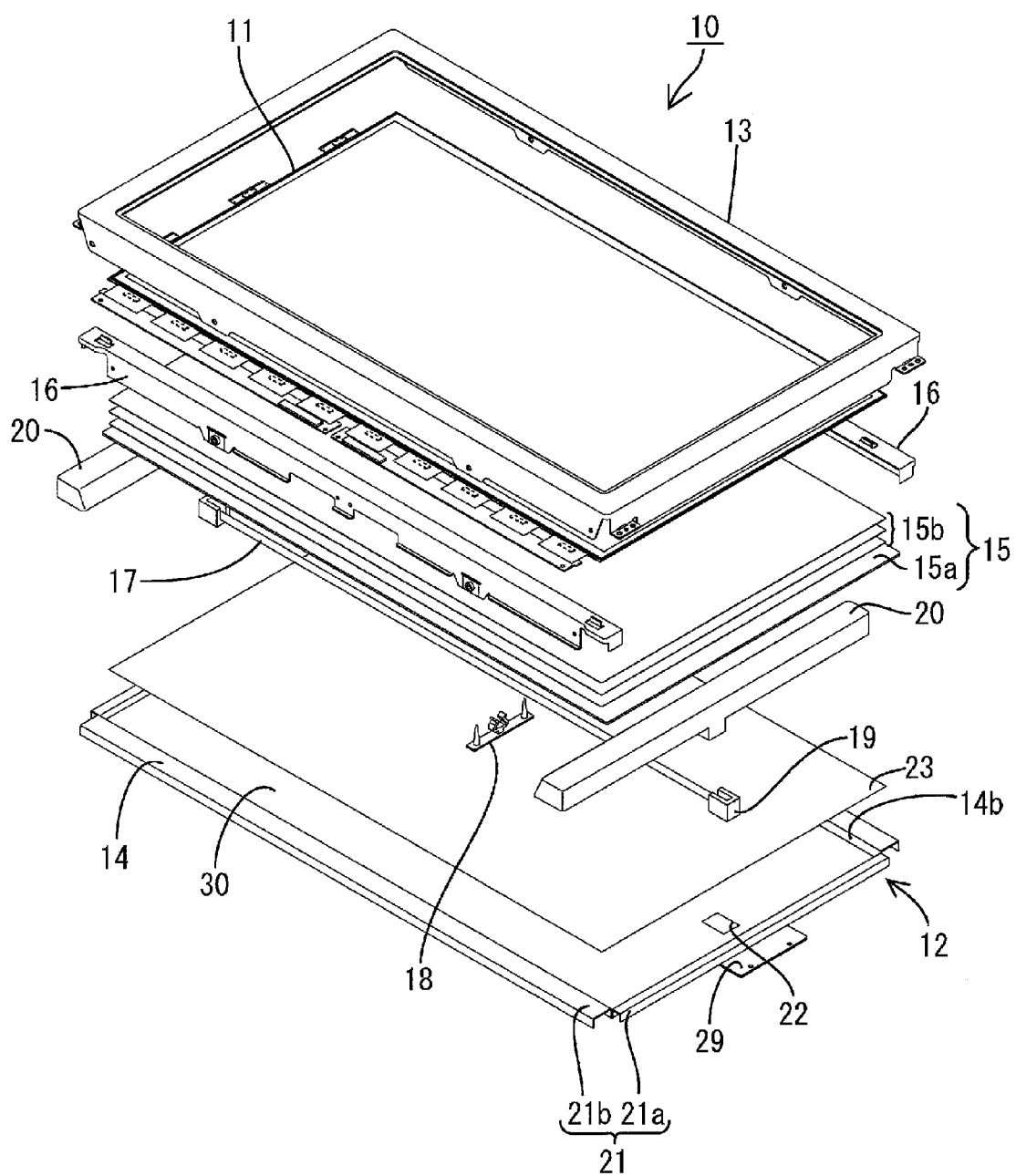
FIG. 2 is an exploded perspective view illustrating a general construction of a liquid crystal display device provided in the television receiver.

As illustrated in FIG. 1, the television receiver TV of the present embodiment includes the liquid crystal display device 10, front and rear cabinets Ca, Cb that house the liquid crystal display device 10 therebetween, a power source P, a tuner T and a stand S. An overall shape of the liquid crystal display device (display device) 10 is a landscape rectangular. The liquid crystal display device 10 is housed in a vertical position such that a short-side direction thereof matches a vertical line. As illustrated in FIG. 2, it includes a liquid crystal panel 11 as a display panel, and a backlight device 12 (lighting device), which is an external light source. They are integrally held by a frame-like bezel 13 and the like.

Next, the liquid crystal panel 11 and the backlight device 12 included in the liquid crystal display device 10 will be explained (see FIGS. 2 to 4).

The liquid crystal panel (display panel) 11 is constructed such that a pair of glass substrates is bonded together with a predetermined gap therebetween and liquid crystal is sealed between the glass substrates. On one of the glass substrates, switching components (e.g., TFTs) connected to source lines and gate lines that are perpendicular to each other, pixel electrodes connected to the switching components, and an alignment film are provided. On the other substrate, a color filter having color sections such as R (red), G (green) and B (blue) color sections arranged in a predetermined pattern, counter electrodes, and an alignment film are provided. Polarizing plates 11a, 11b are attached to outer surfaces of the substrates (see FIGS. 3 and 4).

As illustrated in FIG. 2, the backlight device 12 includes a chassis 14, an optical sheet set 15 (a diffuser (optical member, light diffuser member) 15a and a plurality of optical sheets 15b that are disposed between the diffuser 15a and the liquid crystal panel 11), and frames 16. The chassis 14 has a substantially box-shape and an opening 14b on the light output side (on the liquid crystal panel 11 side). The frames 16 arranged along the long sides of the chassis 14 hold the long-side edges of the diffuser 15a to the chassis 14. The long-side edges of the diffuser 15a are sandwiched between the chassis 14 and the frames 16. A hot cathode tube (light source) 17, lamp clips 18, relay connectors 19 and lamp holders 20 are installed in the chassis 14. The lamp clips 18 are provided for mounting the hot cathode tube 17 to the chassis 14. The relay connectors 19 are connected to ends of the hot cathode tube 17 for making electrical connection. The lamp holder 20 collectively covers each end of the hot cathode tube 17 and the relay connector 19. A light output side of the backlight device 12 is a side closer to the diffuser plate 15a than the hot cathode tube 17.

The chassis 14 is prepared by processing a metal plate. It is formed in a substantially shallow box shape. As illustrated in FIGS. 3 and 4, it includes a rectangular bottom plate 30 and outer rims 21, each of which extends upright from the corresponding side of the bottom plate 30 and has a substantially U shape. The outer rims 21 include short-side outer rims 21a and long-side outer rims 21b provided at the short sides and the long sides of the chassis 14, respectively. The bottom plate 30 of the chassis 14 has a plurality of mounting holes 22 along the long-side edges thereof. The relay connectors 19 are mounted in the mounting holes 22. As illustrated in FIG. 3, fixing holes 14c are provided on the upper surface of the chassis 14 along the long-side outer rims 21b to bind the bezel 13, the frames 16 and the chassis 14 together with screws and the like.

A light reflecting sheet 23 is disposed on an inner surface of the bottom plate 30 of the chassis 14 (on a side that faces the hot cathode tube 17). The light reflecting sheet 23 is a synthetic resin sheet having a surface in white color that provides high light reflectivity. The light reflecting sheet 23 is placed so as to cover almost entire inner surface of the bottom plate 30 of the chassis 14. As illustrated in FIG. 4, long-side edges of the light reflecting sheet 23 are lifted so as to cover the long-side outer rims 21b of the chassis 14 and sandwiched between the chassis 14 and the diffuser 15a. With this light reflecting sheet 23, light emitted from the hot cathode tubes 17 is reflected to the diffuser 15a.

Figure 5:
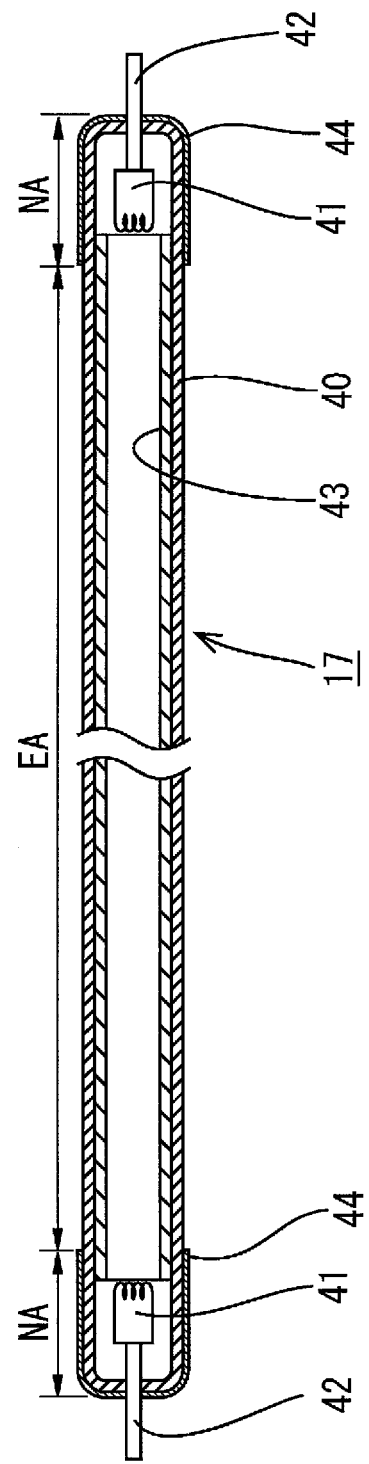
FIG. 5 is a cross-sectional view illustrating a general construction of a hot cathode tube provided in the liquid crystal display device.

The hot cathode tube 17 is formed in an elongated tubular shape having a diameter of 15.5 mm. As illustrated in FIG. 5, the hot cathode tube 17 includes an elongated glass tube 40, electrodes 41 and outer leads 42. Two ends of the glass tube 40 are closed. The electrode 41 is enclosed inside of the glass tube 40 at each end. The outer lead 42 extends outside of the glass tube 40 from the electrode 41. Mercury is sealed inside the glass tube 40. Fluorescent material 43 is coated on an inner wall surface of the glass tube 40. Metal ferrules 44 are fitted to the two ends of the hot cathode tube 17, respectively. The two end portions of the hot cathode tube 17 in which the electrodes 41 are provided (the ferrules 44) are non-luminous ranges NA and the middle portion of the hot cathode tube 17 (the portion on which the fluorescent material 43 is coated) is the luminous range EA.

Figure 6:
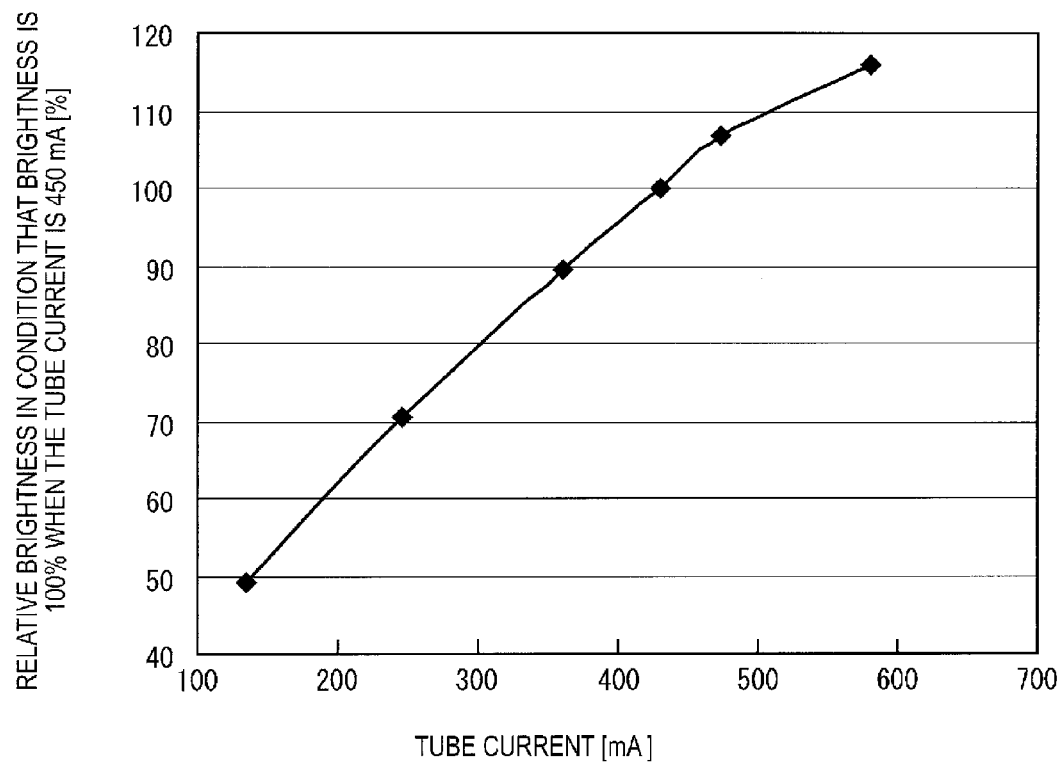
FIG. 6 is graph illustrating relationship between a tube current and relative brightness of the hot cathode tube.

The hot cathode tube 17 has relationship between a tube current and brightness as illustrated in FIG. 6. In FIG. 6, a horizontal shaft represents a tube current of the hot cathode tube and a vertical shaft represents relative brightness in each tube current in condition that brightness is 100 when the tube current is 450 mA. As illustrated in FIG. 6, the hot cathode tube 17 has characteristic in that brightness improves in direct proportion to increase of the tube current if the tube current increases from 155 mA to 600 mA.

Figure 7:
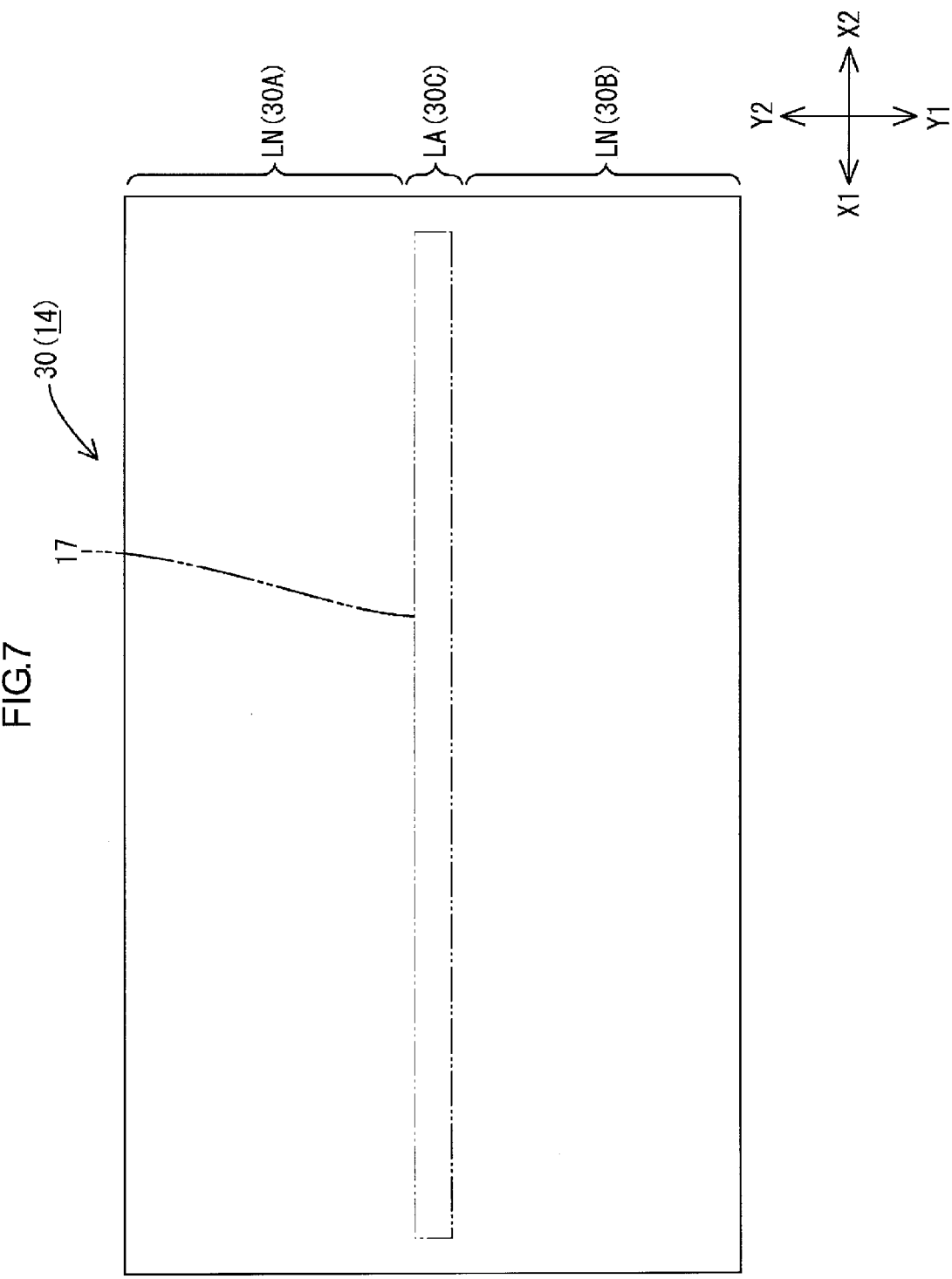
FIG. 7 is a plan view illustrating a general construction of a chassis provided in the backlight device.

The hot cathode tube 17 is arranged in the chassis 14 such that the longitudinal direction (the axial direction) matches the long-side direction of the chassis 14. As illustrated in FIG. 7, the bottom plate 30 of the chassis 14 (the portion facing the diffuser 15a) is defined in three portions in the short-side direction of the chassis 14. The three portions include a first end portion 30A, a second end portion 30B that is located on an opposite side end from the first end portion 30A and a middle portion 30C that is sandwiched between the first end portion 30A and the second end portion 30B. The hot cathode tube 17 is arranged in the middle portion 30C of the bottom plate 30 and a light source installation area LA is formed there. No hot cathode tube 17 is arranged in the first end portion 30A and the second end portion 30B of the bottom plate 30 and an empty area LN is formed there. The hot cathode tube 17 is partially arranged in the middle portion of the bottom plate 30 of the chassis 14 to form the light source installation area LA. An area of the light source installation area LA is smaller than that of the empty area LN. A percentage of the area of the light source installation area LA occupying in the entire area of the bottom plate 30 of the chassis 14 is preferably set to be in a range from 4% to 37% for achieving power saving and ensuring brightness and is set to be 4% in this embodiment.

Figure 3:
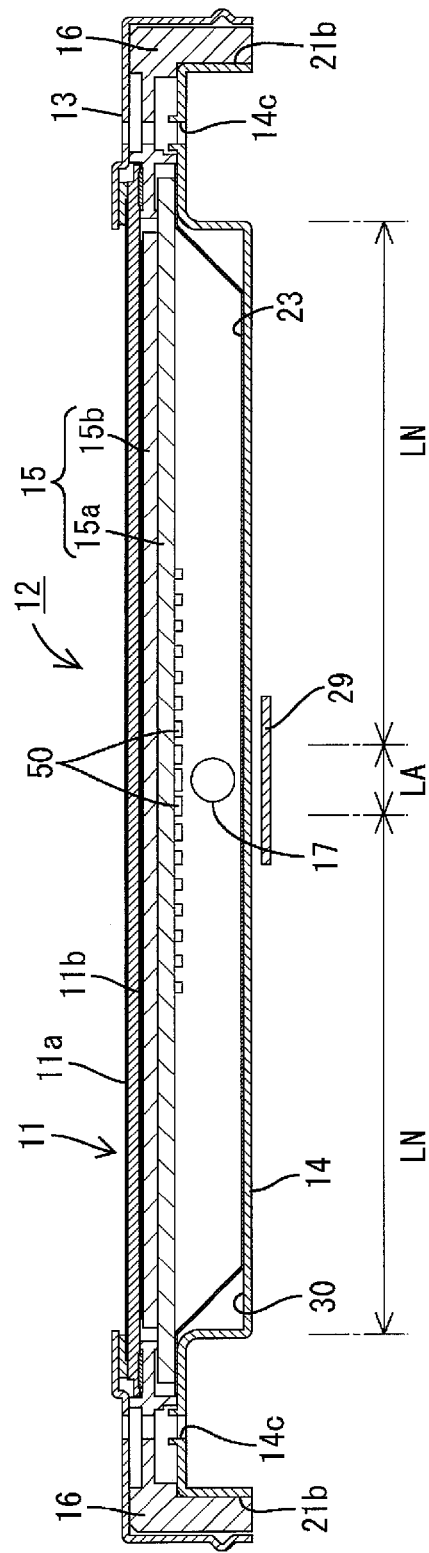
FIG. 3 is a cross-sectional view of the liquid crystal display device along the short-side direction.
Figure 4:
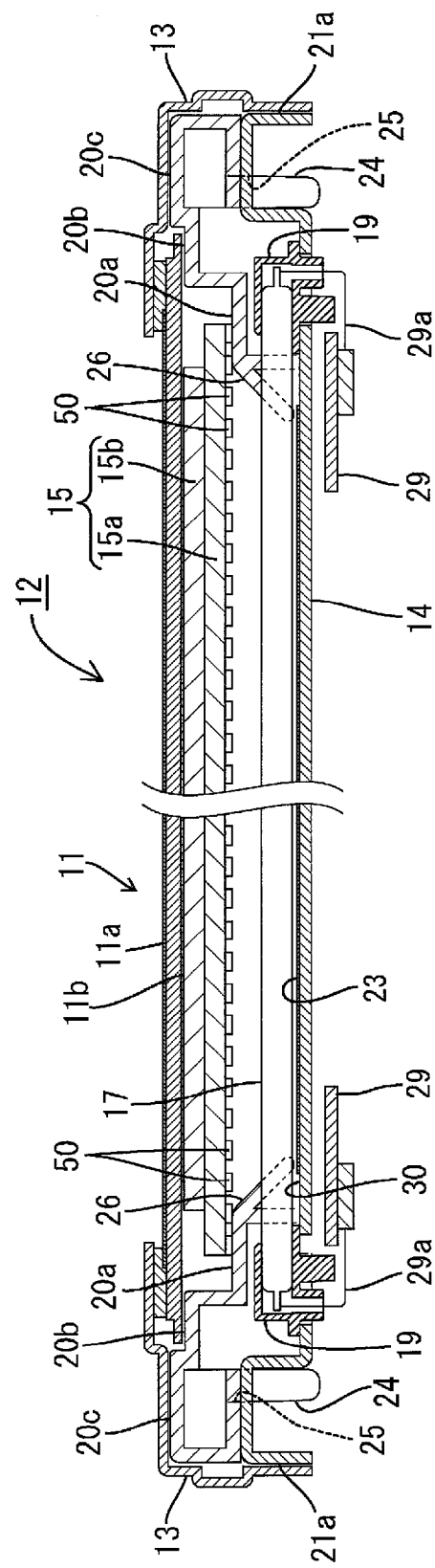
FIG. 4 is a cross-sectional view of the liquid crystal display device along the long-side direction.

On the outer surface of the bottom plate 30 of the chassis 14 (on a side opposite from the hot cathode tube 17), as illustrated in FIGS. 3 and 4, the inverter board set 29 is provided so as to overlap the light source installation area LA, more specifically, to overlap each end of the hot cathode tube 17. Drive power is supplied from the inverter board set 29 to the hot cathode tube 17. Each end of the hot cathode tube 17 has a terminal (not shown) for receiving drive power and electrical connection between the terminal and a harness 29a (see FIG. 4) derived from the inverter board set 29 enables supply of high-voltage drive power. Such electrical connection is established in a relay connector 19 in which the end of the hot cathode tube 17 is fitted. The holders 20 are mounted so as to cover the relay connectors 19.

The holders 20 that cover the ends of the hot cathode tube 17 and the relay connectors 19 are made of white synthetic resin. Each of them has an elongated substantially box shape that extends along the short side of the chassis 14 as illustrated in FIG. 2. As illustrated in FIG. 4, each holder 20 has steps on the front side such that the diffuser 15a and the liquid crystal panel 11 are held at different levels. A part of the holder 20 is placed on top of a part of the corresponding short-side outer rim 21a of the chassis 14 and forms a side wall of the backlight device 12 together with the outer rim 21a. An insertion pin 24 projects from a surface of the holder 20 that faces the outer rim 21a of the chassis 14. The holder 20 is mounted to the chassis 14 by inserting the insertion pin 24 into the insertion hole 25 provided in the top surface of the outer rim 21a of the chassis 14.

The steps of the holder 20 that covers the end of the hot cathode tube 17 include three surfaces that are parallel to the bottom plate 30 of the chassis 14. The three surfaces include a first surface 20a, a second surface 20b and a third surface 20c. The short-side rim of the diffuser plate 15a is placed on the first surface 20a that is located at a lowest level. A slanted cover 26 extends from the first surface 20a toward the bottom plate 30 of the chassis 14 with being slanted. A short-side rim of the liquid crystal panel 11 is placed on the second surface 20b of the holder 20. The third surface 20c that is located at a highest level overlaps the outer rim 21a of the chassis 14 and comes in contact with the bezel 13.

Figure 8:
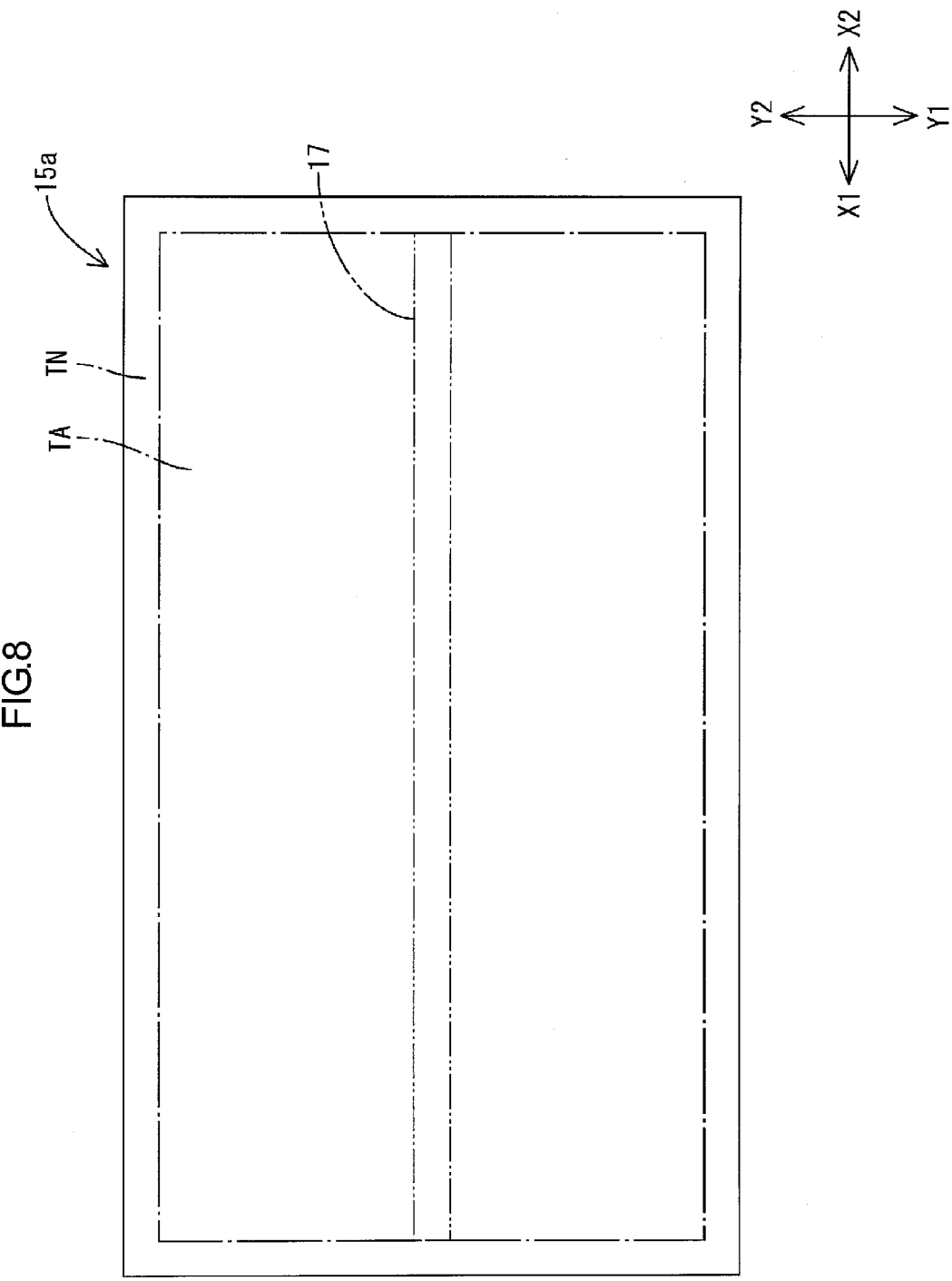
FIG. 8 is a plan view illustrating a general construction of a diffuser provided in the backlight device.

On the opening 14b side of the chassis 14, the optical sheet set 15 including the diffuser (optical member, light diffusing member) 15a and the optical sheets 15b is provided. The diffuser 15a is configured by a plate-like member of synthetic resin and light scattering particles dispersed therein. The diffuser 15a diffuses linear light emitted from the hot cathode tube 17 that is a linear light source and also reflects light emitted from the hot cathode tube 17. Each of the short-side rims of the diffuser 15a is placed on the first surface 20a of the holder and does not receive a vertical force. Thus, the diffuser 15a covers the opening 14b of the chassis 14. As illustrated in FIG. 8, the outer rim portions of the diffuser 15a are placed on the holder 20 or covered by the bezel 13 and therefore, the outer rim portion is a light blocking area TN that does not transmit light from the hot cathode tube 17. A portion of the diffuser 15a inside the light blocking area TN is a transmission area TA through which the light from the hot cathode tube 17 transmits to the liquid crystal panel 11 side.

The optical sheets 15b provided on the diffuser 15a includes a diffuser sheet, a lens sheet and a reflection-type polarizing plate layered in this order from the diffuser plate 15a side. The optical sheets 15b convert the light that is emitted from the hot cathode tube 17 and passes through the diffuser plate 15a to planar light. The liquid crystal display panel 11 is disposed on the top surface of the top layer of the optical sheets 15b. The optical sheets 15b are held between the diffuser 15a and the liquid crystal panel 11.

A light reflecting function of the diffuser 15a will be explained in detail with reference to FIGS. 9 to 11.

Figure 9:
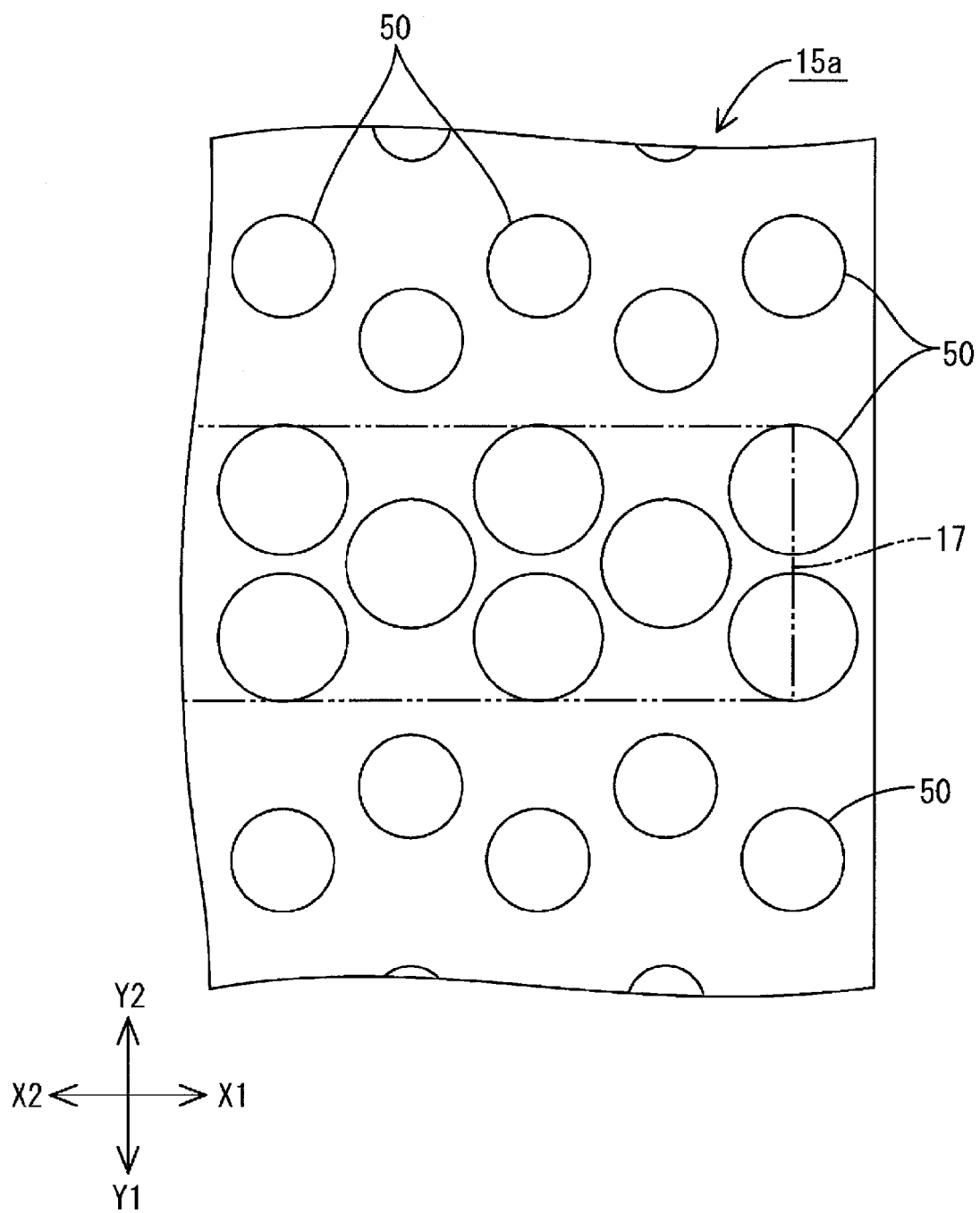
FIG. 9 is a typical view illustrating an arrangement pattern of a light reflecting portion formed on a surface of the diffuser provided in the backlight device that faces the hot cathode tube.
Figure 10:
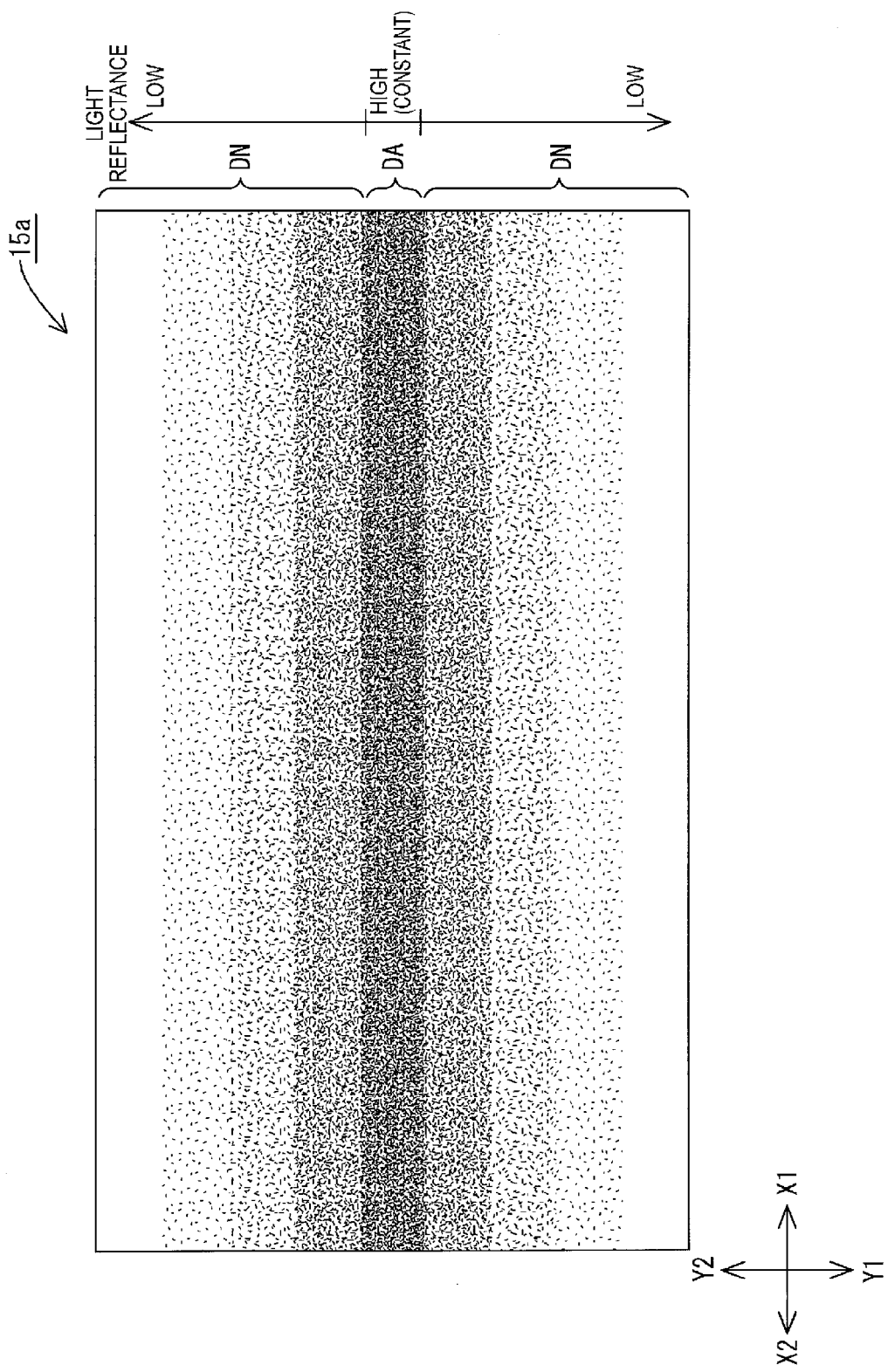
FIG. 10 is a plan view explaining a light reflectance distribution of a surface of the diffuser that faces the hot cathode tube.

FIG. 9 is a typical view illustrating an arrangement pattern of a light reflecting portion formed on the diffuser. FIG. 10 is a plan view explaining a light reflectance distribution of a surface of the diffuser that faces the hot cathode tube. FIG. 11 is a graph illustrating a light reflectance change in a short-side direction of the diffuser in FIG. 9. In FIGS. 9 to 11, the long-side direction of the diffuser is referred to as an X-axis direction and the short-side direction thereof is referred to as a Y-axis direction. In FIG. 11, a horizontal axis shows the Y-axis direction (short-side direction) and the light reflectance is plotted on a graph from an end portion close to Y1 (Y1 end) to a middle portion in the Y-axis direction and from the middle portion to an end portion closer to Y2 (Y2 end) in the Y-axis direction.

As illustrated in FIG. 9, a light reflecting portion 50 configured by a white dot pattern is formed on the diffuser 15a on a surface opposite from the hot cathode tube 17. In the present embodiment, each dot of the light reflecting portion 50 is formed in a circular shape. The dot pattern forming the light reflecting portion 50 is formed by printing paste containing metal oxide (such as titanium oxide), for example, on the surface of the diffuser plate 15a. Preferable printing means is screen printing, inkjet printing and the like.

The light reflecting portion 50 facing the hot cathode tube 17 has a light reflectance of 80% in its surface area and the diffuser 15a facing the hot cathode tube 17 has a light reflectance of 30% in its surface area. Thus, the light reflecting portion 50 has a relatively high light reflectance. In the present embodiment, the light reflectance of each material is represented by an average light reflectance measured with a LAV of CM-3700d (measurement area diameter of 25.4 mm) manufactured by Konica Minolta inside the measurement circle. The light reflectance of the light reflecting portion 50 is measured in the following method. The light reflecting portion 50 is formed over an entire surface of a glass substrate and the light reflectance of the surface is measured according to the above measurement means. The light reflectance of the light reflecting portion 50 is preferably 80% or higher, and more preferably 90% or higher. Thus, as the light reflectance of the light reflecting portion 50 is higher, the light reflection is controlled more precisely and accurately according to a pattern form of the dot pattern such as the number of dots or the area of each dot.

The diffuser 15a has a long-side direction (X-axis direction) and a short-side direction (Y-axis direction). The light reflectance of the surface of the diffuser 15a facing the hot cathode tube 17 changes along the short-side direction by changing the dot pattern of the light reflecting portion 50 as illustrated in FIGS. 10 and 11. In other words, on the surface of the diffuser 15a facing the hot cathode tube 17, the light reflectance of the portion (referred to as a light source overlapping portion DA) that overlaps the light source installation area LA (a portion in which the hot cathode tube 17 is arranged) is higher than the light reflectance of the portion (referred to as an empty area overlapping portion DN) that overlaps the empty area LN (a portion in which no hot cathode tube 17 is arranged). More specifically, in the light source overlapping portion DA of the diffuser 15a, the light reflectance is uniform to be 65% that represents maximum light reflectance Rmax in the diffuser 15a. The light source overlapping portion DA is provided in a middle portion in the short-side direction of the diffuser 15a and the middle portion includes a portion that has the maximum light reflectance Rmax.

On the other hand, in the empty area overlapping surface DN of the diffuser 15a, the light reflectance decreases in a continuous and gradual manner from the portion closer to the light source overlapping portion DA toward the portion away from the light source overlapping portion DA. The light reflectance is lowest to be 30% at two end portions (Y1 end and Y2 end in FIG. 11) of the empty area overlapping portion DN in the short-side direction (Y-axis direction).

Figure 11:
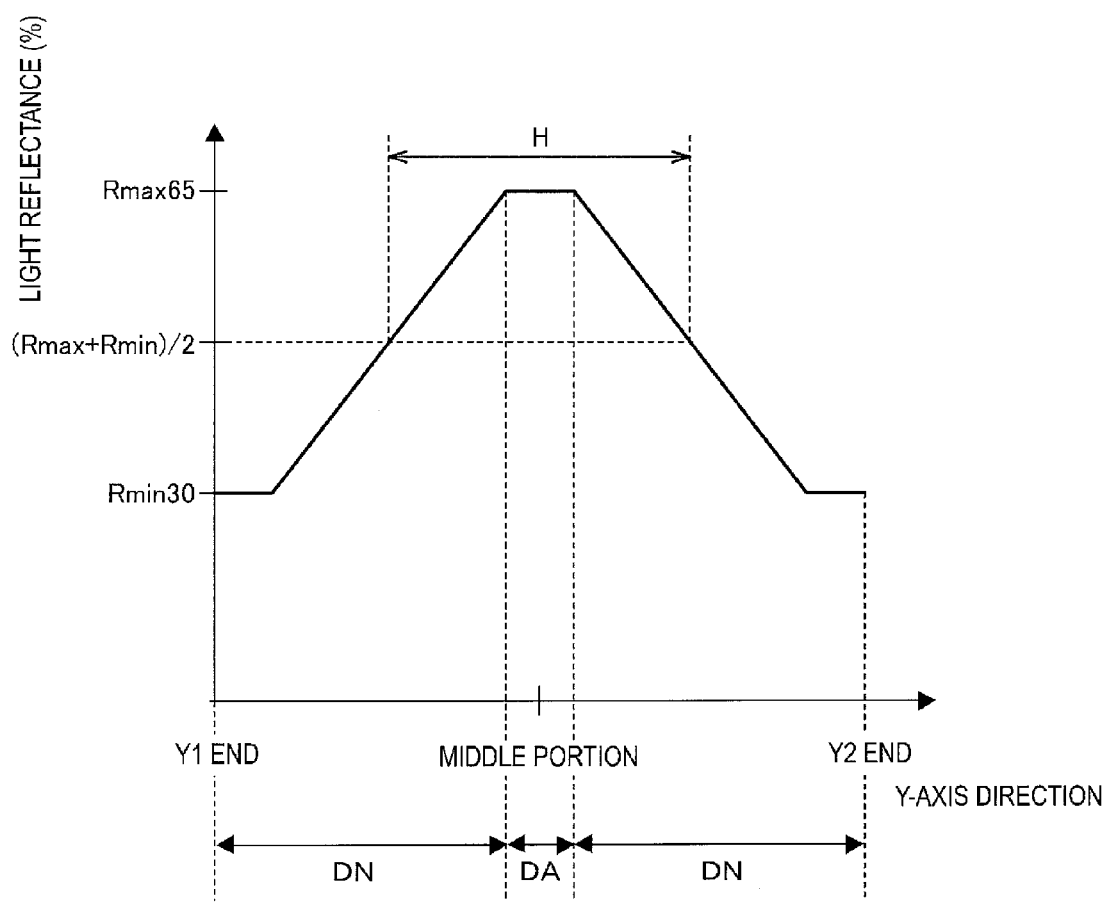
FIG. 11 is a graph illustrating a light reflectance change in a short-side direction of the diffuser in FIG. 10.

In the light reflectance distribution of the diffuser 15a, a distance between two points on the graph in FIG. 11 in each of which the light reflectance is equal to (Rmax+Rmin)/2 (47.5% in this embodiment) corresponds to an entire half-value width H in the light reflectance distribution. In the present embodiment, a length of the entire half-value width H occupies 60% in a width of the transmission area TA of the diffuser 15a in the short-side direction (the Y-axis direction, a direction in which the light reflectance of the diffuser 15a changes).

A distribution of light reflectance of the diffuser 15a is determined by an area of each dot of the light reflecting portion 50. The light reflectance of the light reflecting portion 50 is higher than the light reflectance of the diffuser 15a. Therefore, the light reflectance (degree of reflection in a unit area of the diffuser 15a) relatively increases by relatively increasing the area of each dot of the light reflecting portion 50 and the light reflectance relatively decreases by relatively decreasing the area of each dot of the light reflecting portion 50. Specifically, in the light source overlapping portion DA of the diffuser 15a, the area of each dot of the light reflecting portion 50 is relatively large and uniform. The area of each dot of the light reflecting portion 50 continuously decreases from a border between the light source overlapping portion DA and the empty area overlapping portion DN toward the two end portions of the empty area overlapping portions DN in the short-side direction. As control means for controlling the light reflectance, the area of each dot of the light reflecting portion 50 may be set to be same and a distance between the dots may be changed.

In the backlight device 12, the tube current of the hot cathode tube 17 is set to be constant to be 450 mA, and the maximum light reflectance Rmax of the diffuser 15a and the occupation percentage of the entire half-value width H in the transmission area TA are set to be various values in several examples. Table 1 represents illumination quality obtained in the examples.

In Table 1, the occupation percentage of the entire half-value width H in the transmission area TA represents a percentage of the length of the entire half-value width H obtained when the light reflectance in the light reflectance distribution in the short-side direction of the diffuser 15a is equal to (Rmax+Rmin)/2 in a width of the transmission area TA of the diffuser 15a in the short-side direction.

Figure 12:
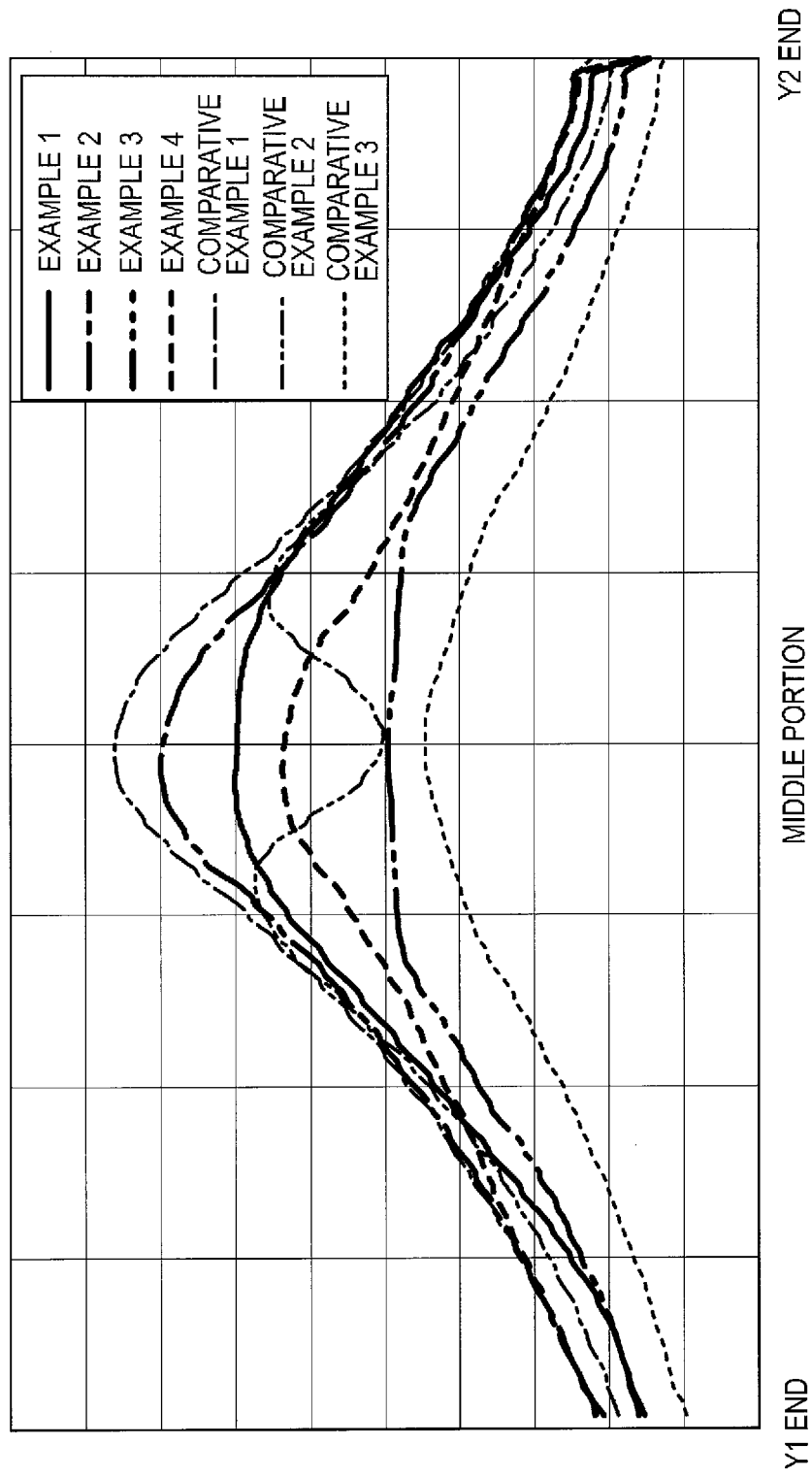
FIG. 12 is a graph illustrating a brightness distribution with each maximum light reflectance and each entire half-value width.

In the illumination brightness distribution of the backlight device 12 illustrated in FIG. 12, the illumination quality represents ◉ if having predetermined improved brightness and a quite moderate brightness distribution, the illumination quality represents ○ if having predetermined improved brightness and an almost moderate brightness distribution, and the illumination quality represents X if having no predetermined improved brightness or the brightness distribution being not moderate.

TABLE 1

| | Tube current [mA] | Maximum light reflectance Rmax [%] | Occupation percentage of entire half-value width H in illumination area TA [%] | Brightness in middle portion [cd/m2] | Display quality |
|---|---|---|---|---|---|
| Example 1 | 450 | 65 | 60 | 350 | ◉ |
| Example 2 | 450 | 40 | 70 | 400 | ○ |
| Example 3 | 450 | 68 | 25 | 250 | ○ |
| Example 4 | 450 | 65 | 80 | 320 | ○ |
| Comparative Example 1 | 450 | 35 | 66 | 430 | X |
| Comparative Example 2 | 450 | 68 | 20 | 250 | X |
| Comparative Example 3 | 450 | 65 | 85 | 223 | X |

As is apparent from Table 1 and FIG. 12, if the diffuser 15a has maximum light reflectance Rmax of 40% or higher, the backlight device 12 has predetermined improved brightness and a moderate brightness distribution. Especially, if the maximum light reflectance Rmax is 65% or higher, the brightness distribution becomes more moderate. If the maximum light reflectance Rmax is lower than 40% (35% in Comparative Example 1), the light is easily transmitted through the middle portion of the diffuser 15a (the light source overlapping portion DA) and the brightness is quite high in the middle portion and a moderate brightness distribution is not obtained.

The occupation percentage of the entire half-value width H in the transmission area TA is 25% or more and 80% or less. Accordingly, the backlight device 12 has predetermined improved brightness and substantially a moderate brightness distribution. If the occupation percentage of the entire half-value width H in the transmission area TA is less than 25% (20% in Comparative Example 2), the light from the hot cathode tube 17 is locally reflected easily in the middle portion of the diffuser 15a. Accordingly, brightness in a portion adjacent to the middle portion is relatively improved and the brightness distribution is not moderate. If the occupation percentage of the entire half-value width H in the transmission area TA is greater than 80% (85% in Comparative Example 3), the light from the hot cathode tube 17 is excessively reflected by the diffuser 15a in its entire area. Therefore, predetermined improved brightness is not obtained and brightness is especially lowered in end portions of the diffuser 15a.

As is explained before, in the present embodiment, the maximum light reflectance Rmax of the diffuser 15a is set to 40% or higher in the light source overlapping portion DA and the entire half-value width H having the light reflectance of (Rmax+Rmin)/2 occupies 25% to 80% in the width of the transmission area TA of the diffuser 15a through which light from the hot cathode tube 17 transmits. Accordingly, a moderate illumination brightness distribution without any local dark portion can be obtained.

If the maximum light reflectance Rmax of the diffuser 15a is 65% or higher in the light source overlapping portion DA, the light from the hot cathode tube 17 is easily reflected by the light source overlapping portion DA and this makes the light to be reflected again in the chassis 14. This may increase the amount of light reaching the empty area overlapping portion DN. Accordingly, the empty area overlapping portion DN is less likely to cause dark portions and substantially a uniform illumination brightness distribution can be achieved.

In the present embodiment, the middle portion of the diffuser 15a has the maximum light reflectance Rmax.

The light from the hot cathode tube 17 is likely to be collected in the middle portion of the diffuser 15a. The middle portion having the maximum light reflectance Rmax effectively reflects light from the hot cathode tube 17 and substantially a uniform illumination brightness distribution can be achieved.

In the present embodiment, the diffuser 15a includes the light source overlapping portion DA that overlaps the hot cathode tube 17 and the empty area overlapping portion DN that does not overlap the hot cathode tube 17. The light reflecting portion 50 that reflects light from the hot cathode tube 17 is formed on at least the light source overlapping portion DA.

With such a configuration, light output from the hot cathode tube 17 first reaches the light source overlapping portion DA of the diffuser 15a that is the portion having light reflecting portion 50. Therefore, most of the light reflects off the light source overlapping portion DA (does not pass through the light source overlapping portion DA), and the brightness of illumination light is suppressed with respect to the light emission amount from the hot cathode tubes 17. On the other hand, the light that reflects off the light source overlapping portion DA is further reflected in the chassis 14 and the light reaches the empty area overlapping portion DN. Predetermined brightness of illumination light is achieved. This achieves power saving without arranging a plurality of hot cathode tubes 17 and substantially a uniform brightness distribution is achieved in the backlight device 12.

In the present embodiment, the light reflecting portion 50 is configured by a dot pattern having light reflectivity. The light reflection is controlled by a pattern form (the number (the density) of dots or an area of each dot). Accordingly, uniform illumination brightness can be easily obtained.

The light reflecting portion 50 is configured such that the light reflectance decreases in a continuous and gradual manner from the portion having higher light reflectance to the portion having lower light reflectance.

The light reflectance of the light reflecting portion 50 on the diffuser 15a decreases in a continuous and gradual manner so as to have a gradation. This makes the distribution of illumination light brightness to be moderate and the backlight device 12 can achieve a uniform distribution of illumination light brightness.

The light reflecting portion 50 contains a material that provides white. Therefore, light reflectivity is easily applied to the light reflecting portion 50.

According to the present embodiment, the chassis 14 is configured such that the bottom plate 30 facing the diffuser 15a is defined in a first end portion 30A, a second end portion 30B and a middle portion 30C that is sandwiched between the first and second end portions 30A and 30B. The second end portion 30B is on the opposite end side from the first end portion 30A. One of the first end portion 30A, the second end portion 30B and the middle portion 30C corresponds to the light source installation area LA in which the hot cathode tube 17 is arranged and the rest corresponds to the empty areas LN in which no hot cathode tube 17 is arranged.

With this configuration, compared to a case in which a plurality of hot cathode tubes 17 are arranged evenly in the entire chassis 14, the number of hot cathode tubes 17 is reduced and a cost reduction and power saving of the backlight device 12 are achieved.

In the present embodiment, an area of the light source installation area LA is smaller than that of the empty area LN in the chassis 14.

In such a case that the area of the light source installation area LA is smaller than that of the empty area LN, with the configuration of the present embodiment, the light from the hot cathode tube 17 is reflected by the light reflecting portion 50 to be guided to the empty area LN in the chassis 14. This maintains uniform illumination brightness and achieves cost reduction and power saving.

The light source installation area LA is provided in the middle portion 30C of the chassis 14.

This ensures sufficient brightness in a middle portion of the backlight device 12 and also ensures brightness in a middle portion of the display in the liquid crystal display device 10 including the backlight device 12 and the liquid crystal display device 10 obtains good visibility.

In the present embodiment, the diffuser 15a is configured by a light diffusing member that diffuses light from the hot cathode tube 17.

With this configuration, the light transmission of the light source overlapping portion DA and the empty area overlapping portion DN of the diffuser 15a is controlled by changing the light reflectance distribution of the light reflecting portion 50, and also the light diffusing member diffuses light. This achieves uniform brightness in the surface area of the backlight device 12.

The present invention is not limited to the first embodiment, and may include a following modification. In the following modification, the same components and parts as the first embodiment are indicated by the same symbols and will not be explained.

First Modification of First Embodiment

Figure 13:
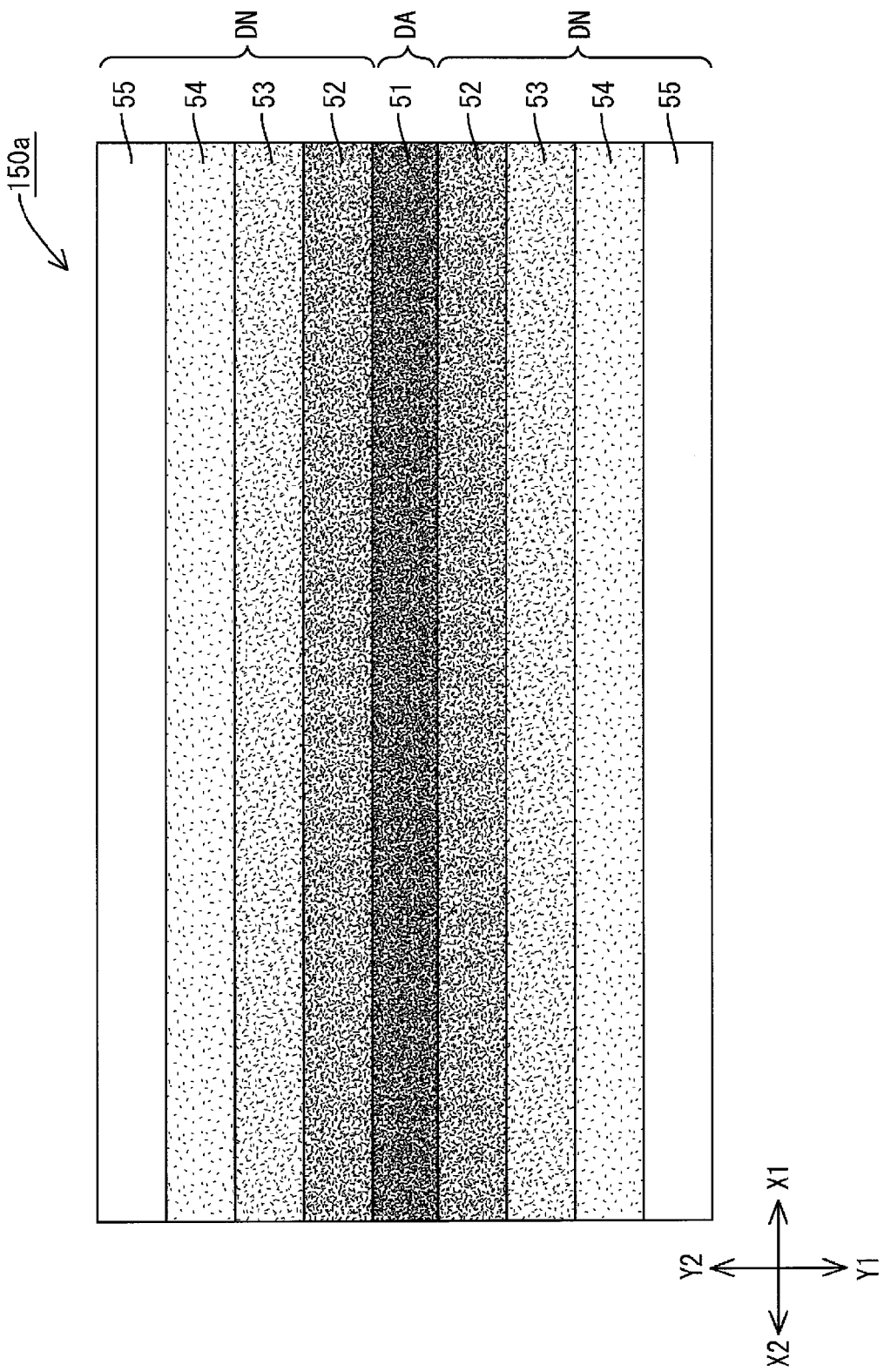
FIG. 13 is a plan view illustrating a light reflectance distribution of a surface of the diffuser that faces the hot cathode tube according to one modification.
Figure 14:
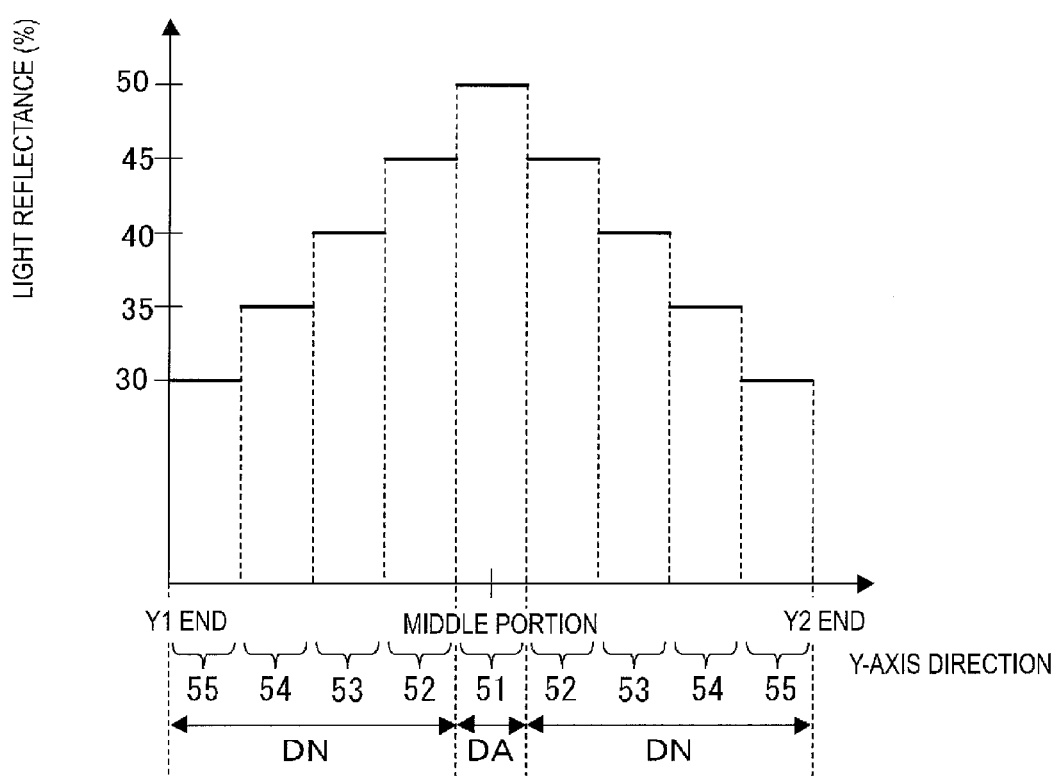
FIG. 14 is a graph illustrating a light reflectance change in a short-side direction of the diffuser in FIG. 13.

The light reflectance distribution of the diffuser 15a may be modified as illustrated in FIGS. 13 and 14. FIG. 13 is a plan view illustrating a light reflectance distribution of a surface of the diffuser in FIG. 13 that faces the hot cathode tube according to one modification. FIG. 14 is a graph illustrating a light reflectance change in the short-side direction of the diffuser in FIG. 13. In the following modification, the same components and parts as the first embodiment are indicated by the same symbols and will not be explained.

As illustrated in FIGS. 13 and 14, the light source overlapping portion DA of a diffuser 150a (a surface of the portion that overlaps the light source installation area LA facing the hot cathode tube 17) has the highest light reflectance, and in the empty area overlapping portion DN of the diffuser 150a (a surface of the portion that overlaps the empty area LN facing the hot cathode tube 17), the light reflectance decreases in a stepwise and gradual manner from the portion closer to the light source overlapping portion DA toward the portion farther therefrom. Namely, in the empty area overlapping portion DN of the diffuser 150a, the light reflectance changes step by step along the short-side direction (Y-axis direction) of the diffuser 150a. More specifically, as illustrated in FIG. 13, a first area 51 having relatively high light reflectance is provided in the light source overlapping portion DA that is located in the middle portion of the diffuser 150a, and second areas 52, 52 having light reflectance relatively lower than the first area 51 are provided next to the first area 51 in the empty area overlapping portion DN located at the sides of the first area 51. Further, in the empty area overlapping portion DN, third areas 53, 53 having light reflectance relatively lower than the second areas 52 are provided at the sides of the second areas 52, fourth areas 54, 54 having light reflectance lower than the third areas 53 are provided at the sides of the third areas 53, and fifth areas 55, 55 having light reflectance lower than the fourth areas 54 are provided at the sides of the fourth areas 54.

In this modification, as illustrated in FIG. 14, the light reflectance of the diffuser 150a is 50% in the first area, 45% in the second area, 40% in the third area, 35% in the fourth area, and 30% in the fifth area and it changes with equal ratio. In the first to fourth areas, the area of each dot of the light reflecting portion 50 is changed to determine the above light reflectance, and the light reflectance in the fifth area in which no light reflecting portion 50 is provided is represented by the light reflectance of the diffuser 150a.

A plurality of areas 52, 53, 54, 55 having different light reflectance are defined in the empty area overlapping portion DN of the diffuser 150a. The light reflectance is reduced from the second area 52 to the fifth area 55 sequentially in this order such that the light reflectance decreases in a stepwise and gradual manner from the portion closer to the light source overlapping portion DA toward the portion farther therefrom.

According to such a configuration, the brightness distribution of illumination light in the empty area overlapping portion DN (empty area LN) is made moderate and the backlight device 12 can obtain a moderate illumination brightness distribution. With the means for forming a plurality of areas 52, 53, 54, 55 having different light reflectance, a manufacturing method of the diffuser 150a becomes simple and this contributes to a cost reduction.

Second Modification of First Embodiment

In a second modification of the first embodiment, a color adjustment function is applied to portion is added to the light reflecting portion 50. The second modification will be explained with reference to FIGS. 15 to 18.

Figure 15:
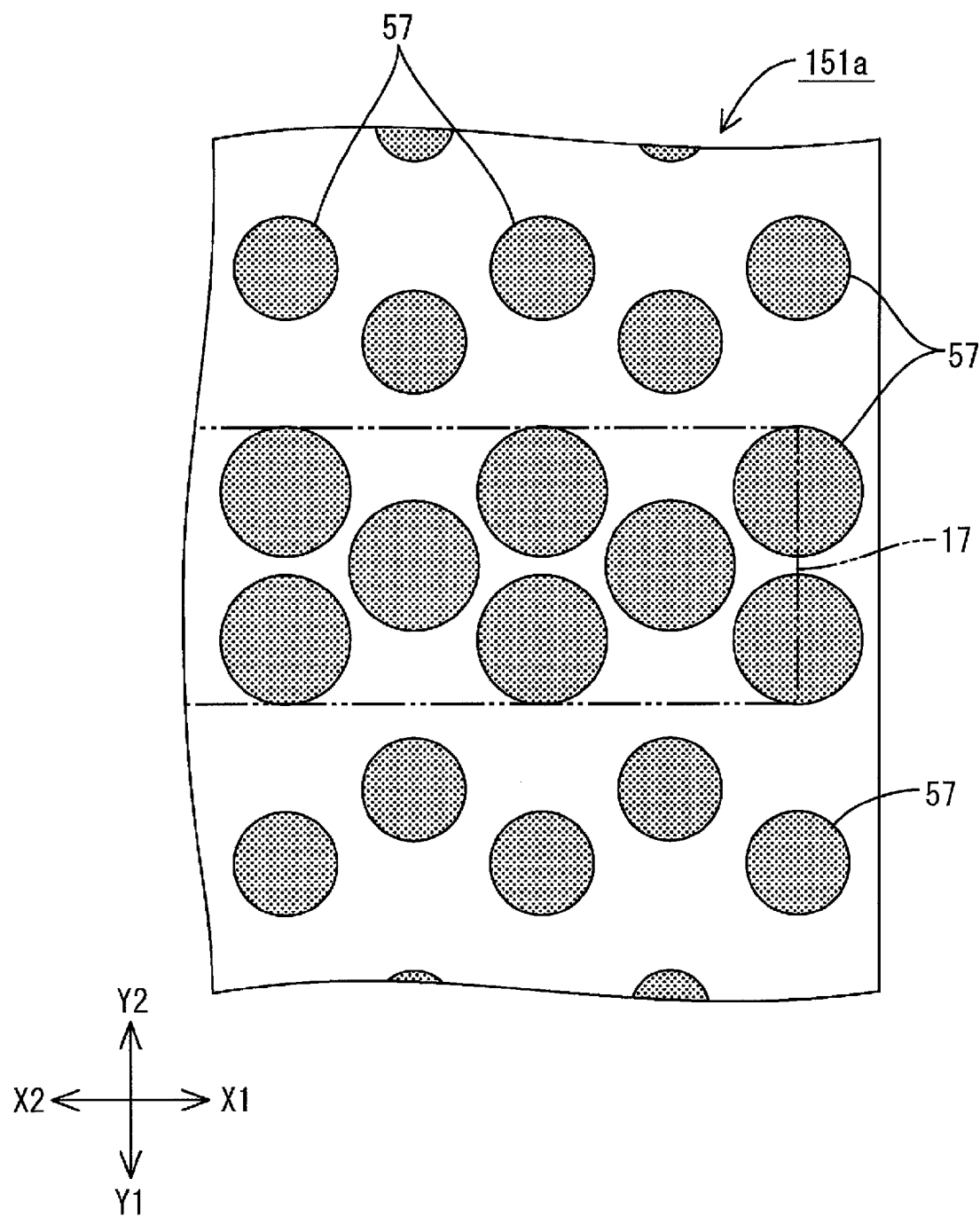
FIG. 15 is a plan view illustrating an arrangement pattern of the light reflecting portion formed on a surface of the diffuser that faces the hot cathode tube according to one modification.
Figure 16:
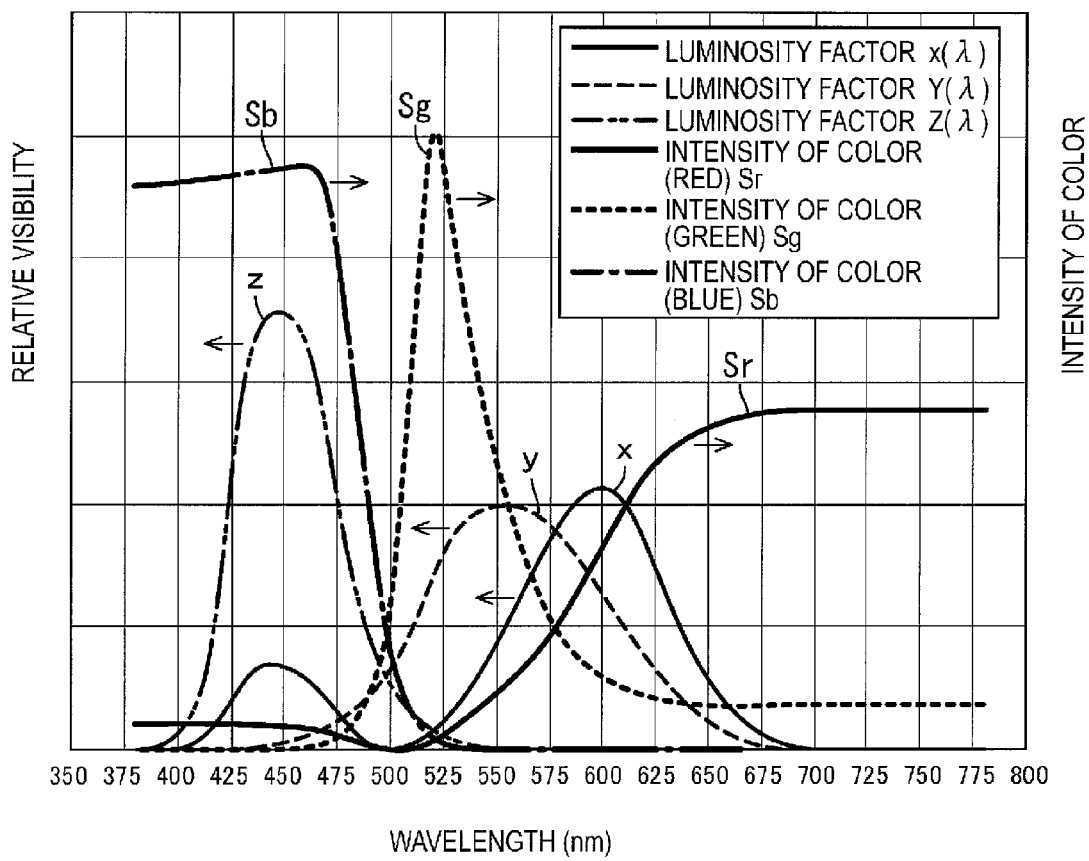
FIG. 16 is a spectral plot of each color.
Figure 17:
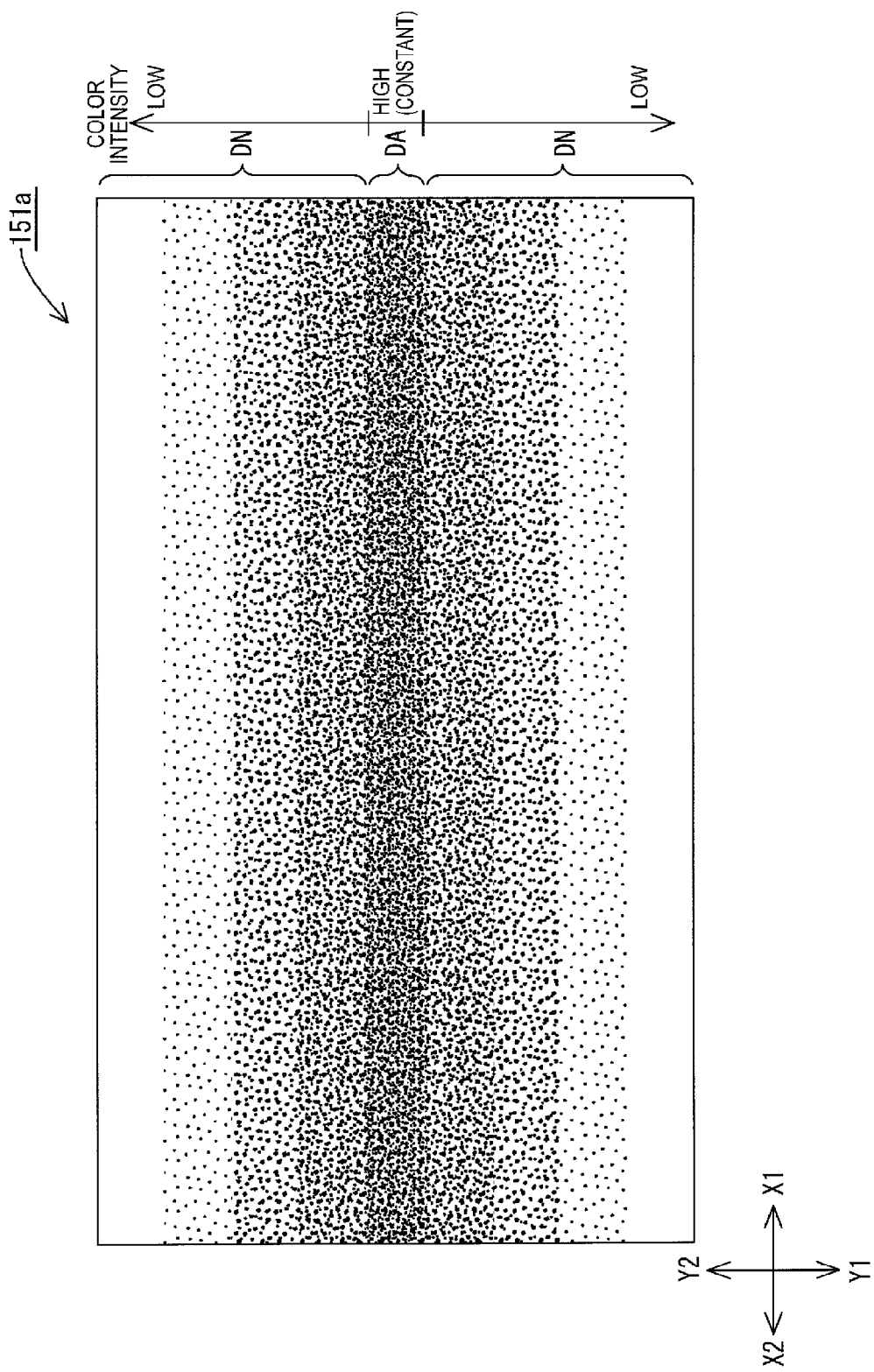
FIG. 17 is a plan view explaining a distribution of color intensity of a surface of the diffuser that faces the hot cathode tube.
Figure 18:
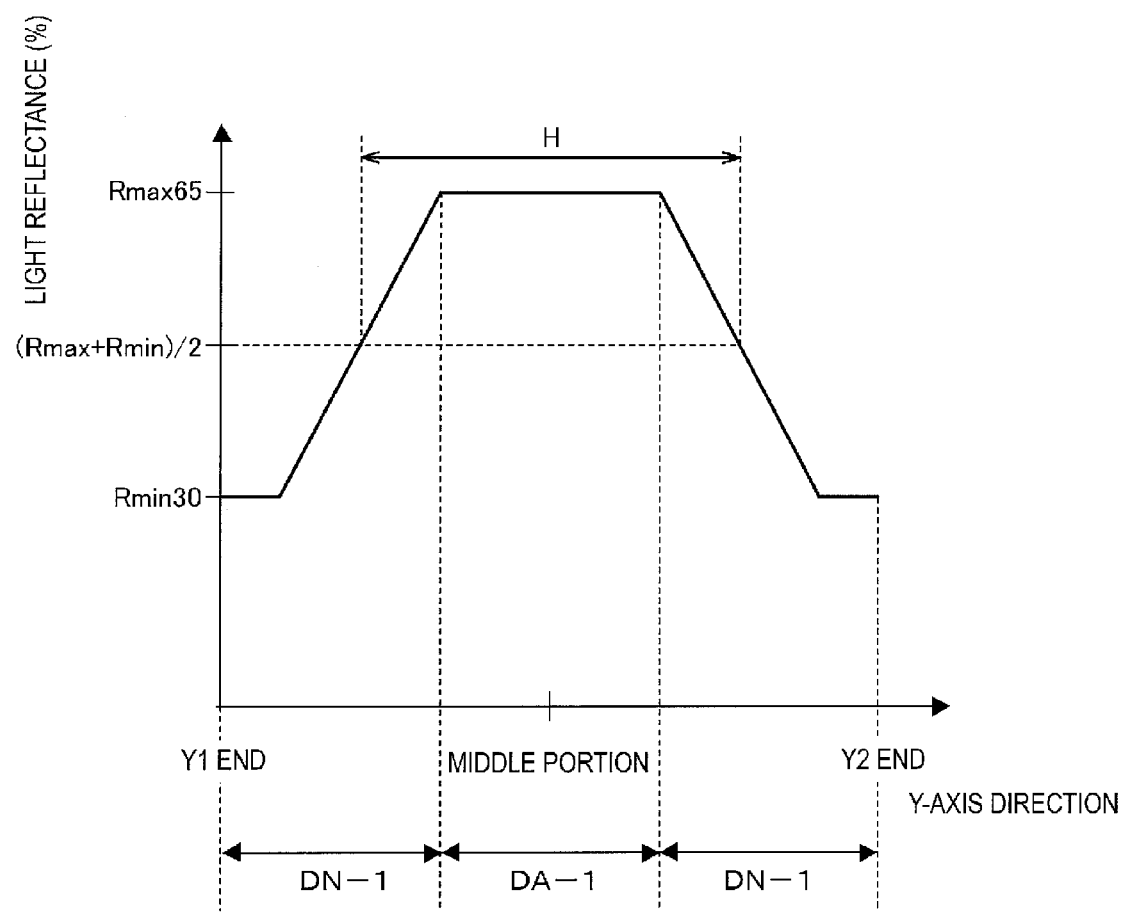
FIG. 18 is a graph illustrating a color intensity change in the short-side direction of the diffuser in FIG. 17.

FIG. 15 is a plan view illustrating an arrangement pattern of the light reflecting portion formed on a surface of the diffuser that faces the hot cathode tube. FIG. 16 is a spectral plot of each color. FIG. 17 is a plan view explaining a distribution of color intensity of a surface of the diffuser that faces the hot cathode tube. FIG. 18 is a graph illustrating a color intensity change in the short-side direction of the diffuser in FIG. 17. In FIGS. 17 and 18, the long-side direction of the diffuser is referred to as an X-axis direction and the short-side direction thereof is referred to as a Y-axis direction. In FIG. 18, a horizontal axis shows the Y-axis direction (short-side direction) and the light reflectance is plotted on a graph from an end portion close to Y1 (Y1 end) to a middle portion in the Y-axis direction and from the middle portion to an end portion closer to Y2 (Y2 end) in the Y-axis direction.

A light reflecting portion 57 is formed by a material containing phthalocyanine-type cyan pigment in a paste containing white metal oxide (such as titanium oxide). Therefore, the light reflecting portion 57 provides a color of cyan. The material that is contained in the light reflecting portion 57 and provides cyan color may be arbitrarily selected from pigments and dye that provide cyan color. Phthalocyanine-type cyan pigment is excellent in durability and preferable for the environment.

Colors of the color reflecting portion 57 will be explained. In FIG. 16, each of x($\lambda$), y($\lambda$), z($\lambda$) represents a color-matching function that is defined in the CIE color system. The color-matching function is also called a visibility function and represents wavelength dependency of three levels of sensitivity that human beings can sense. In FIG. 16, Sr, Sg, Sb represent color intensity curves of red (Sr), green (Sg) and blue (Sb), respectively. Each of the color intensity curves of Sr, Sg, Sb has one of the three levels of sensitivity function that is most dominant. The color intensity curves are obtained by the following formulas (1) to (3).

$$Sr=x(\lambda)/(2*(y(\lambda)+z(\lambda)))  \quad \text{Formula (1)}$$

$$Sg=y(\lambda)/(2*(x(\lambda)+z(\lambda)))  \quad \text{Formula (2)}$$

$$Sb=z(\lambda)/(2*(x(\lambda)+y(\lambda)))  \quad \text{Formula (3)}$$

In the present embodiment, the color of cyan has an absorption band in the light of wavelength longer than the wavelength of 500 nm that is a crossing point of the color intensity curve of green (Sg) and the color intensity curve of red (Sr). The color of blue has an absorption band in the light of wavelength longer than the wavelength of 500 nm that is a crossing point of the color intensity curve of green (Sg) and the color intensity curve of blue (Sb). In the present embodiment, the light reflecting portion 57 is not limited to be configured by a cyan coloring material but may be configured by a coloring material having an absorption band in the light of relatively long wavelength, and is configured preferably by a coloring material of a color having an absorption band in the light of wavelength longer than 500 nm. A hue between cyan and blue and having an absorption band in the light of wavelength longer than 500 nm can be used for the light reflecting portion 57.

On the diffuser 151a, the color intensity of the light reflecting portion 57 changes in every area from light source overlapping portion DA toward the empty area overlapping portion DN. On the diffuser 151a, the dot pattern of the light reflecting portion 57 changes so that the color intensity of cyan changes in the short-side direction of the diffuser 151a as illustrated in FIGS. 17 and 18. On the diffuser 151a, the color intensity of cyan is highest in the light source overlapping portion DA of the diffuser 151a and the color intensity of cyan decreases in a continuous manner in the empty area overlapping portion DN from a portion closer to the light source overlapping portion DA toward a portion away therefrom. No light reflecting portion 57 is formed in each end portion (Y1 end and Y2 end in FIG. 18) of the empty area overlapping portion DN and the end portions have a color of the diffuser 151a. Thus, the diffuser 151a has relatively higher color intensity in the light source overlapping portion DA than the empty area overlapping portion DN.

With the configuration of the present embodiment, a coloring material that provides cyan is provided in the light reflecting portion 57. Therefore, the light having a hue of relatively long wavelength can be absorbed in the light reflecting portion 57. Accordingly, even if the light reaching the light reflecting portion 57 takes on a yellow tinge, the light having a yellow hue is absorbed by the light reflecting portion 57 and uniform white light is obtained.

The light reflecting portion 57 is configured by mixing the material providing white and the material providing cyan. Therefore, the light reflecting function and the color adjustment function for changing a yellow color to a white color can be provided to the light reflecting portion 57.

Third Modification of First Embodiment

Figure 19:
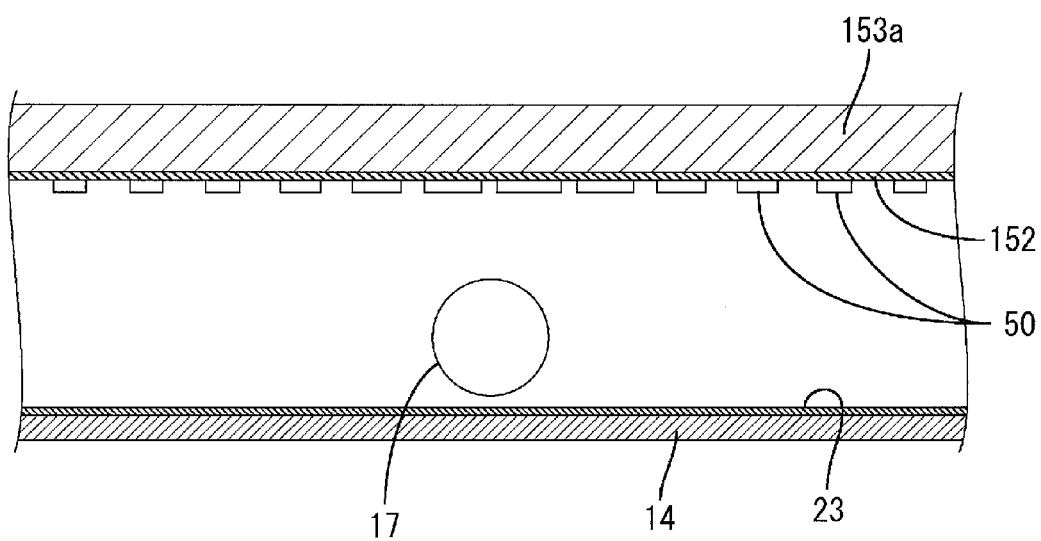
FIG. 19 is a cross sectional view illustrating a construction of the optical member according to one modification.

In the first embodiment, the light reflecting portion 50 is formed on the diffuser 15a. For example, the optical member may be configured as illustrated in FIG. 19. As illustrated in FIG. 19, the light reflecting portion 50 that reflects light from the hot cathode tube 17 is formed on a surface of a transparent (highly translucent) light reflection sheet 152 that faces the hot cathode tube 17. The light reflection sheet 152 is adhered to a surface of a diffuser 153a that faces the hot cathode tube 17 by an adhesive. The light from the hot cathode tube 17 is diffused by the diffuser 153a. The light reflection sheet 152 may be adhered to the diffuser 153a with thermocompression bond. With such a configuration, the optical member may have light reflectivity and light diffusing property and this achieves uniform surface area brightness of the backlight device 12.

Second Embodiment

Next, a second embodiment of the present invention will be explained with reference to FIGS. 20 to 23. In the second embodiment, an arrangement pattern of the light source is altered from the first embodiment and other configuration is similar to the first embodiment. In the second embodiment, the same components and parts as the first embodiment are indicated by the same symbols and will not be explained.

Figure 20:
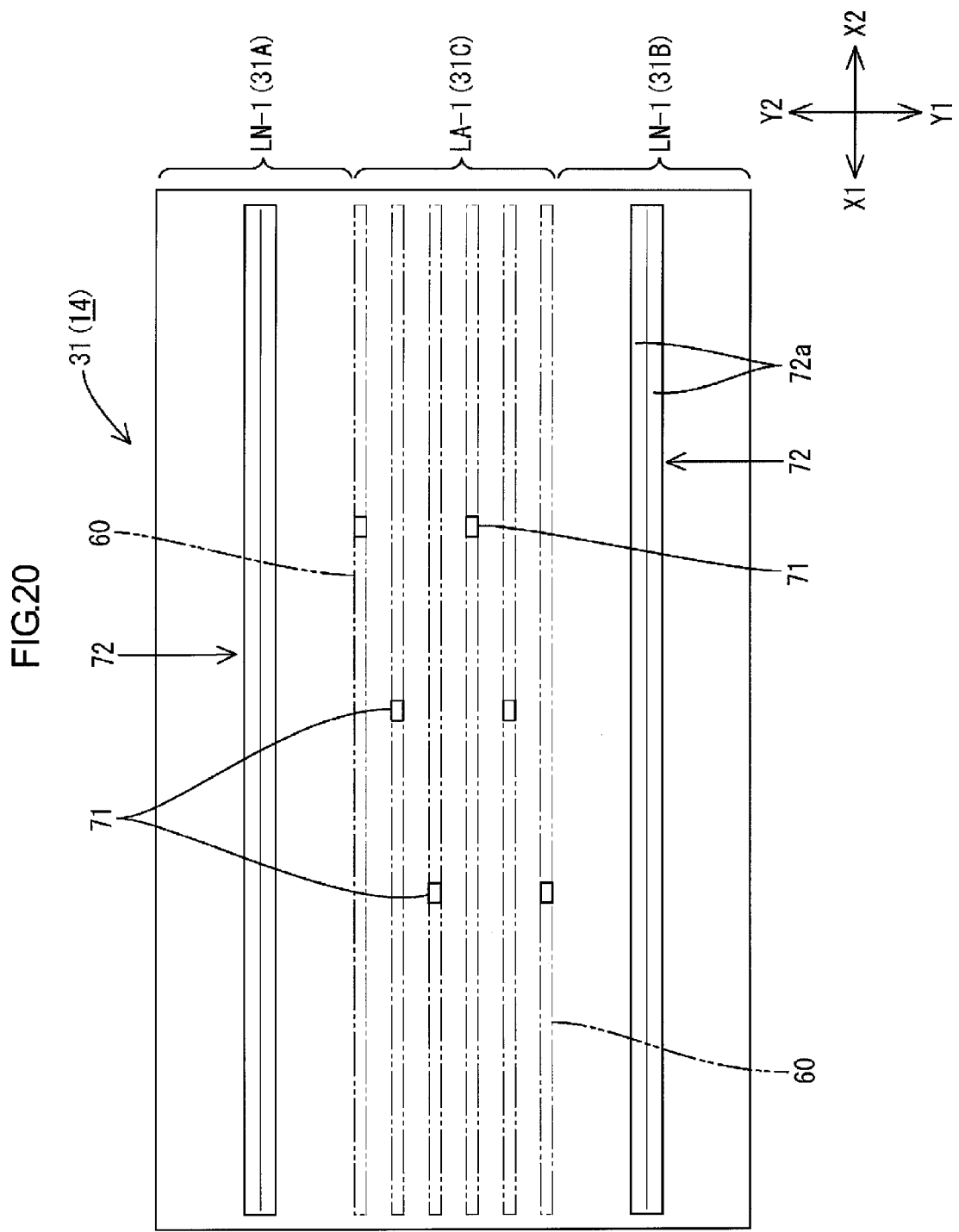
FIG. 20 is a plan view illustrating a general construction of a chassis provided in a backlight device according to a second embodiment of the present invention.
Figure 21:
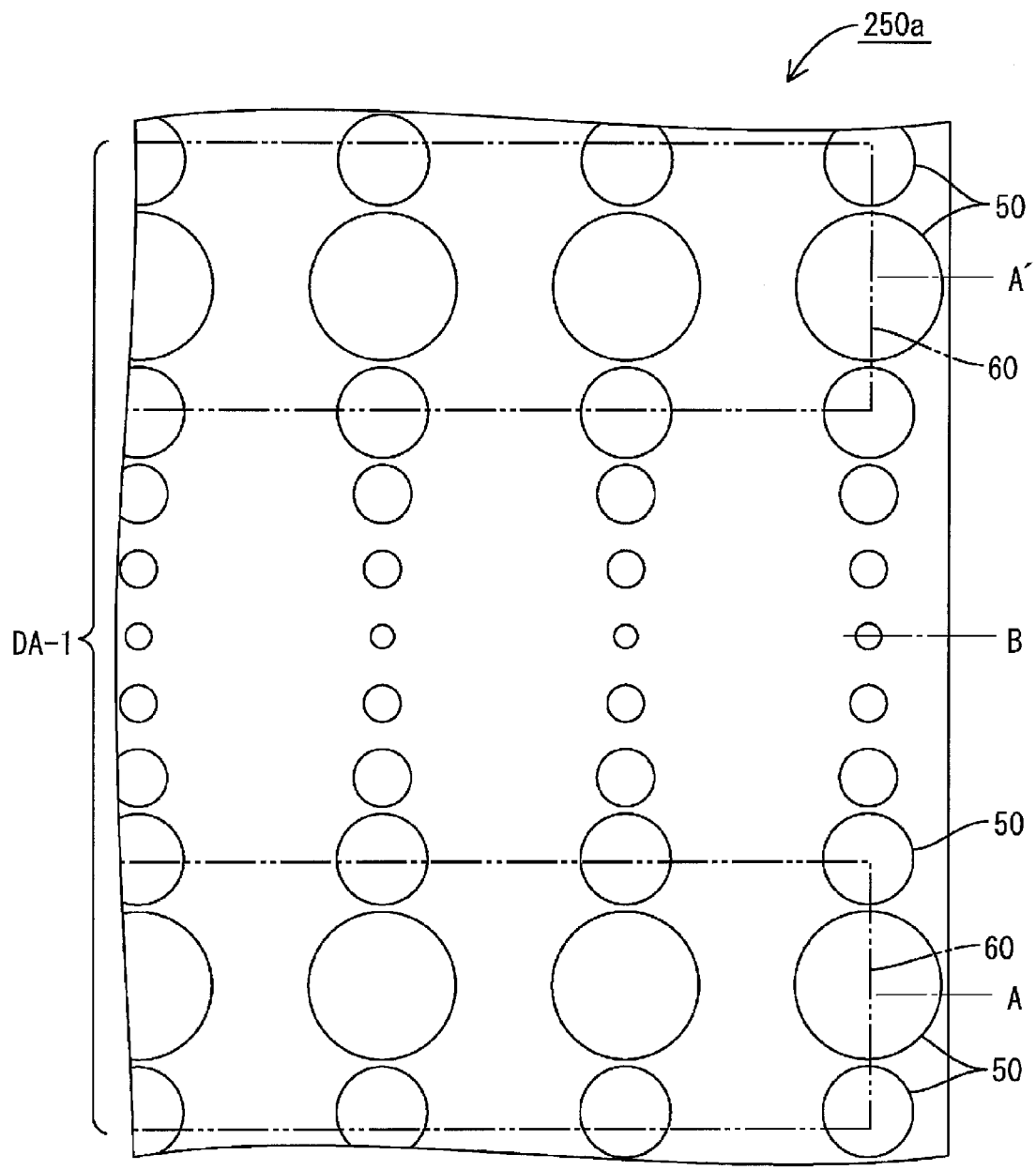
FIG. 21 is a typical view illustrating an arrangement pattern of the light reflecting portion formed in a middle portion on a surface of the diffuser that faces cold cathode tubes.
Figure 22:
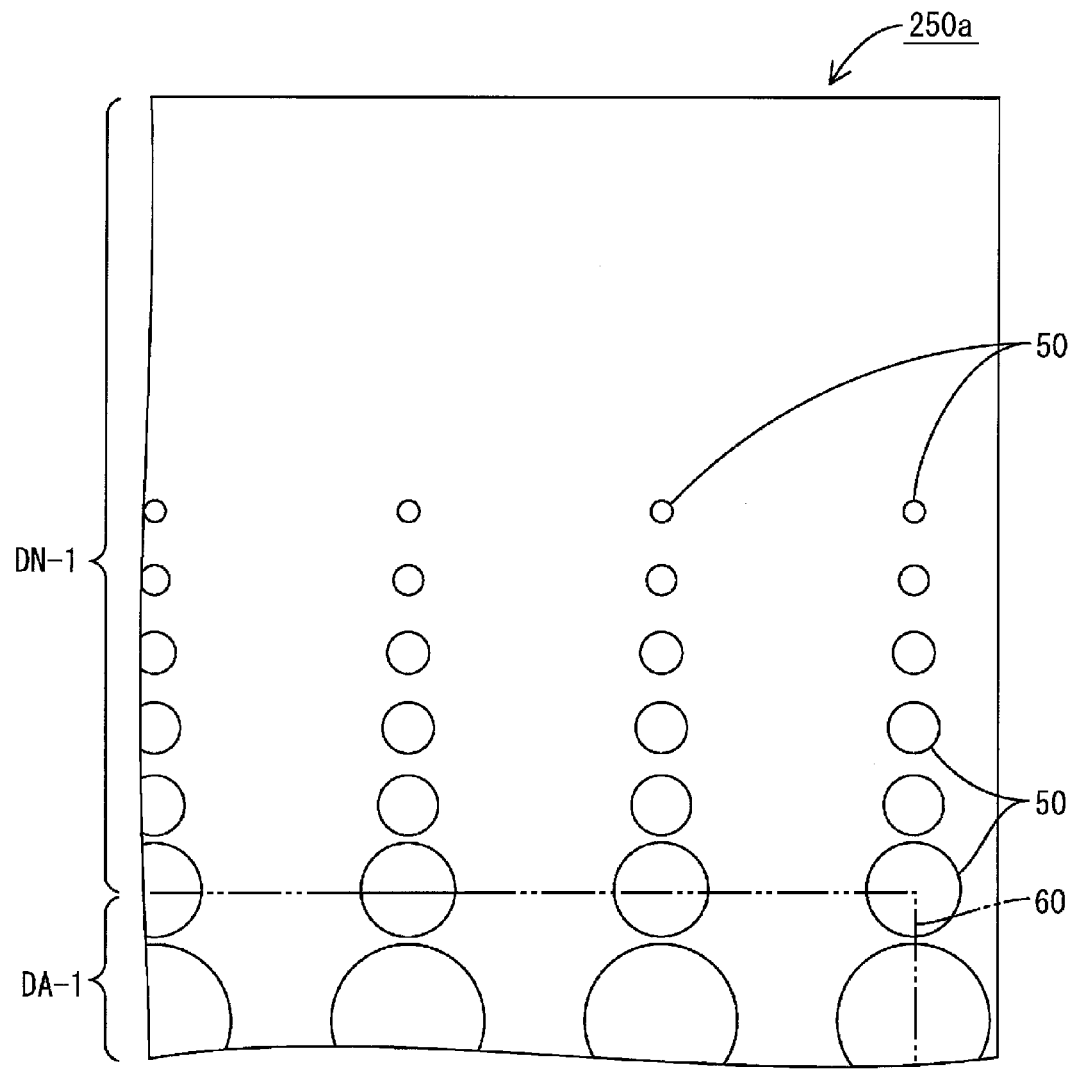
FIG. 22 is a typical view illustrating an arrangement pattern of the light reflecting portion that is formed in an end portion on a surface of the diffuser that faces the cold cathode tubes.
Figure 23:
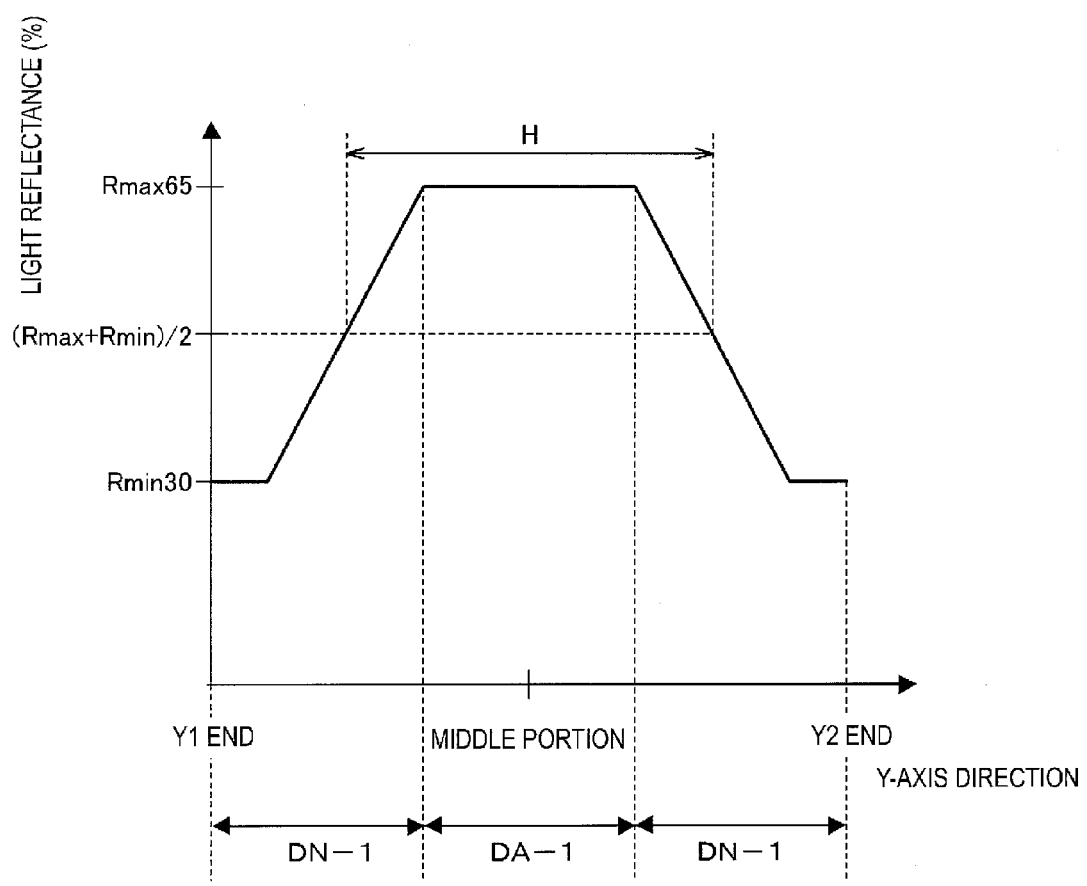
FIG. 23 is a graph illustrating light reflectance in the short-side direction of the diffuser in FIG. 22.

FIG. 20 is a plan view illustrating a general construction of a chassis provided in a backlight device. FIG. 21 is a typical view illustrating an arrangement pattern of the light reflecting portion formed in a middle portion on a surface of the diffuser that faces cold cathode tubes. FIG. 22 is a typical view illustrating an arrangement pattern of the light reflecting portion that is formed in an end portion on a surface of the diffuser that faces the cold cathode tubes. FIG. 23 is a graph illustrating light reflectance in the short-side direction of the diffuser. In FIG. 23, a horizontal axis shows the Y-axis direction (short-side direction) and the light reflectance is plotted on a graph from an end portion close to Y1 (Y1 end) to a middle portion in the Y-axis direction and from the middle portion to an end portion closer to Y2 (Y2 end) in the Y-axis direction.

Each cold cathode tube 60 has an elongated tubular shape having a diameter of 4.0 mm. A plurality of the cold cathode tubes 60 are installed in the chassis 14 such that they are arranged parallel to each other with the long-side direction (axial direction) thereof aligned along the long-side direction of the chassis 14. The cold cathode tubes 60 are arranged in a portion in the chassis 14. More specifically, as illustrated in FIG. 20, a bottom plate 31 of the chassis 14 (a portion facing a diffuser 250a) is defined in the short-side direction equally in a first end portion 31A, a second end portion 31B that is located at an end opposite from the first end portion 31A and a middle portion 31C that is sandwiched between the first end portion 31A and the second end portion 31B. The cold cathode tubes 60 are arranged in the middle portion 31C of the bottom plate 31 and a light source installation area LA-1 is formed in the middle portion 31C. On the other hand, no cold cathode tube 60 is arranged in the first end portion 31A and the second end portion 31B of the bottom plate 31 and an empty area LN-1 is formed in the first end portion 31A and the second end portion 31B. A percentage of an area of the light source installation area LA-1 occupying in an entire area of the bottom plate 31 of the chassis 14 can be changed. The percentage is preferably set in a range from 20% to 60% to achieve power saving and ensure brightness, and it is 42% in this embodiment.

In the light source installation area LA-1 of the bottom plate 31 of the chassis 14, the cold cathode tubes 60 are held by the lamp clips (not shown) to be supported with a small gap between the cold cathode tubes 60 and the bottom plate 31 of the chassis 14. Heat transfer members 71 are disposed in the gap such that a part of the cold cathode tube 60 is in contact with the bottom plate 31. Heat is transferred from the cold cathode tubes 60 that are lit and have high temperature to the chassis 14 via the heat transfer members 71. Therefore, the temperature of the cold cathode tubes 60 is lowered at the portions in which the heat transfer members 71 are arranged and the coldest points are forcibly generated there. As a result, the brightness of each one of the cold cathode tubes 60 is improved and this contributes to power saving.

In each of the empty areas LN-1 of the bottom plate 31 of the chassis 14, that is, in each of the first end portion 31A and the second end portion 31B of the bottom plate 31, a convex reflecting portion 72 extends along the long-side direction of the bottom plate 31. The convex reflecting portion 72 is made of a synthetic resin and has a surface in white color that provides high light reflectivity. Each convex reflecting portion 72 has two sloped surfaces 72a, 72a that are sloped toward the bottom plate 31 and one of which faces the cold cathode tube 60. The convex reflecting portion 72 is provided such that its longitudinal direction matches an axial direction of the cold cathode tubes 60 arranged in the light source installation area LA-1. One sloped surface 72a directs light emitted from the cold cathode tubes 60 to the diffuser 250a. The sloped surface 72a of the convex reflecting portion 72 reflects the light emitted from the cold cathode tubes 60 to the diffuser 250a side, and therefore the emitted light is effectively used.

As illustrated in FIG. 21, the light reflecting portion 50 that forms a dot pattern is formed on a surface of the diffuser 250a that faces the cold cathode tubes 60. The dot pattern is formed by printing paste containing metal oxide (such as titanium oxide) on the surface of the diffuser 250a. An area of each dot of the light reflecting portion 50 is largest in the portion overlapping the light source installation area LA-1 (the light source overlapping portion DA-1). An area of each dot of the light reflecting portion 50 decreases in a continuous manner from the portion closer to the cold cathode tube 60 toward the portion farther away therefrom. Therefore, as illustrated in FIG. 23, the light reflectance of the portion of the diffuser 250a is highest in the light source overlapping portion DA-1 and decreases in a continuous manner in the empty area overlapping portion DN-1 from the portion closer to the light source overlapping portion DA-1 toward the portion farther away therefrom. In the present embodiment, the diffuser 250a has the highest light reflectance in the light source overlapping portion DA and the maximum light reflectance Rmax is 65%. In the light reflectance distribution of the diffuser 250a, a percentage of the length of the entire half-value width H that is obtained by (Rmax+Rmin)/2 occupying in the short-side direction (a direction in which the light reflectance of the diffuser 250a changes) width of the transmission area TA of the diffuser 250a is 80%.

With the configuration described above, the light emitted from the cold cathode tubes 60 first reaches the light source overlapping portions DA-1 of the diffuser 250a. The light source overlapping portions DA-1 having the light reflecting portion 50 thereon have high light reflectance. Therefore, most of the light reflects off the light source overlapping portions DA-1, and the brightness of illumination light is suppressed with respect to the light emission amount from the cold cathode tubes 60. On the other hand, the light that reflects off the light source overlapping portions DA-1 is further reflected in the chassis 14 and the light may reach the empty area overlapping portions DN-1. In the diffuser 250a, the light reflectance of the empty area overlapping portions DN-1 is relatively low and a larger amount of light passes through the empty area overlapping portions DN-1 and thus predetermined brightness of illumination light is achieved. Thus, power saving can be achieved in the backlight device 12 without arranging a plurality of cold cathode tubes 60 and a moderate illumination brightness distribution can be obtained.

Third Embodiment

A third embodiment of the present invention will be explained with reference to FIGS. 24 to 27. In the third embodiment, the arrangement pattern of the light source is altered from the first embodiment and other configuration is similar to the first embodiment. In the third embodiment, the same components and parts as the first embodiment are indicated by the same symbols and will not be explained.

Figure 24:
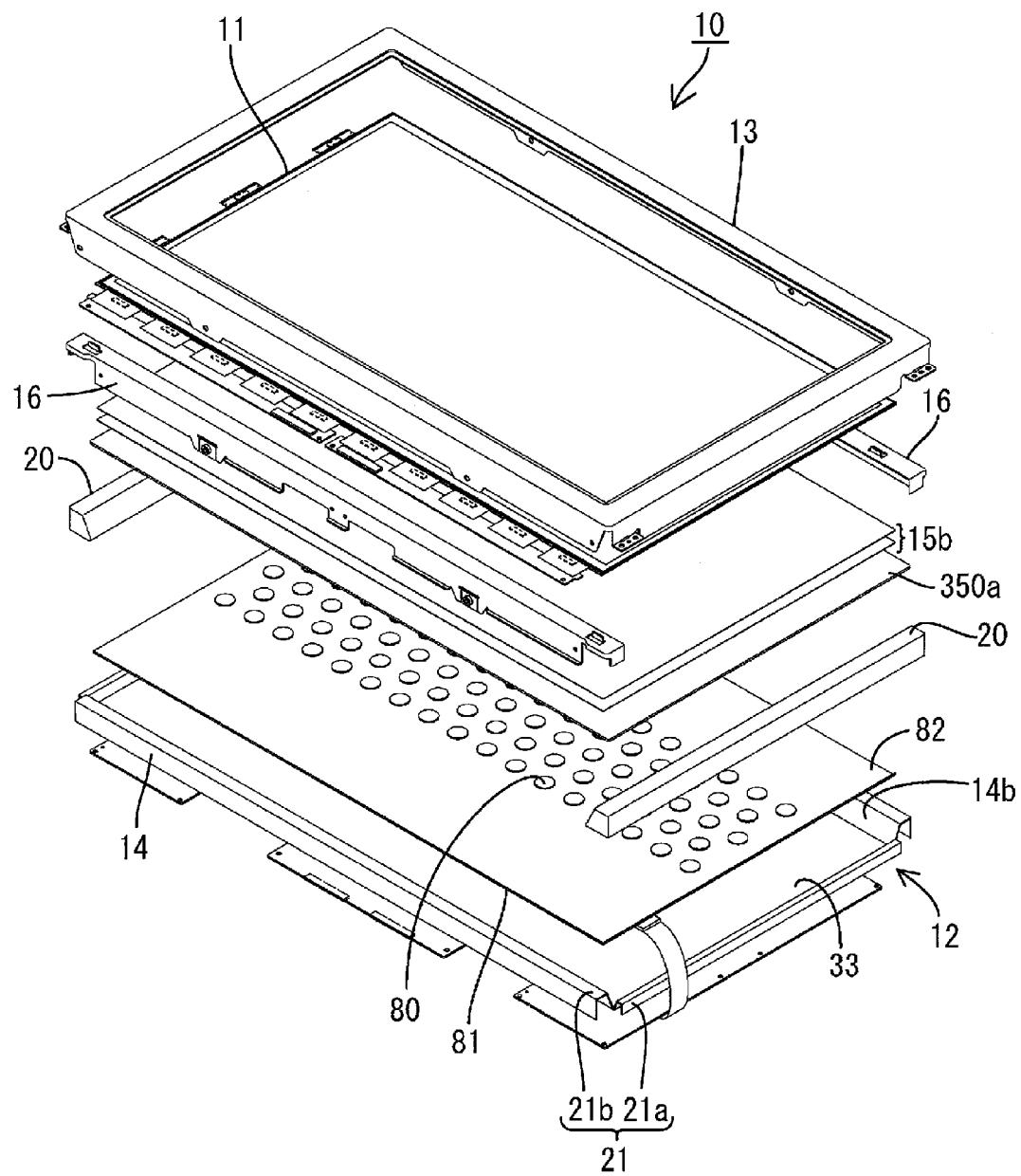
FIG. 24 is an exploded perspective view illustrating a general construction of a liquid crystal display device according to a third embodiment of the present invention.
Figure 25:
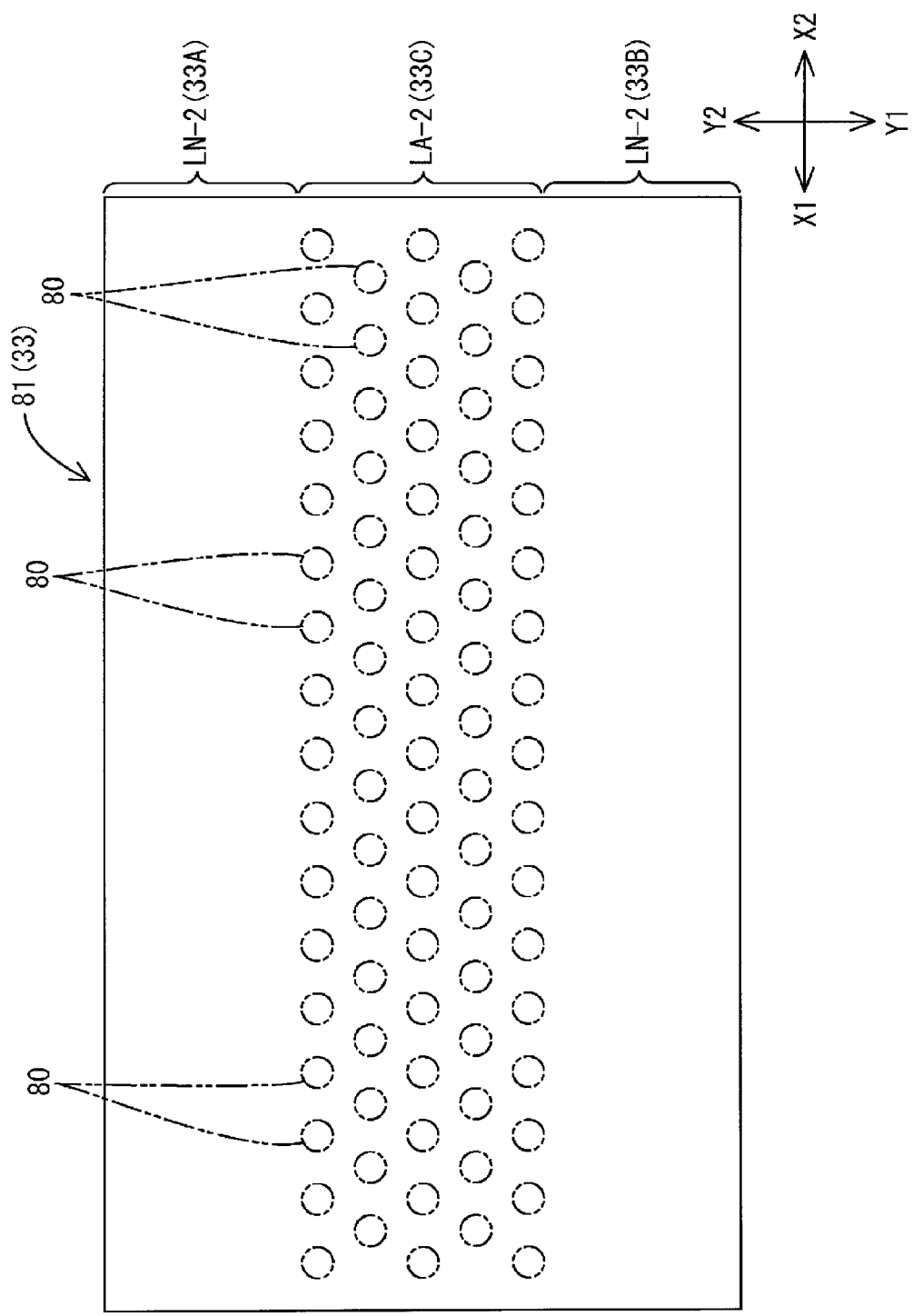
FIG. 25 is a general plan view of a chassis illustrating an arrangement pattern of LED light sources provided in the liquid crystal display device in FIG. 24.
Figure 26:
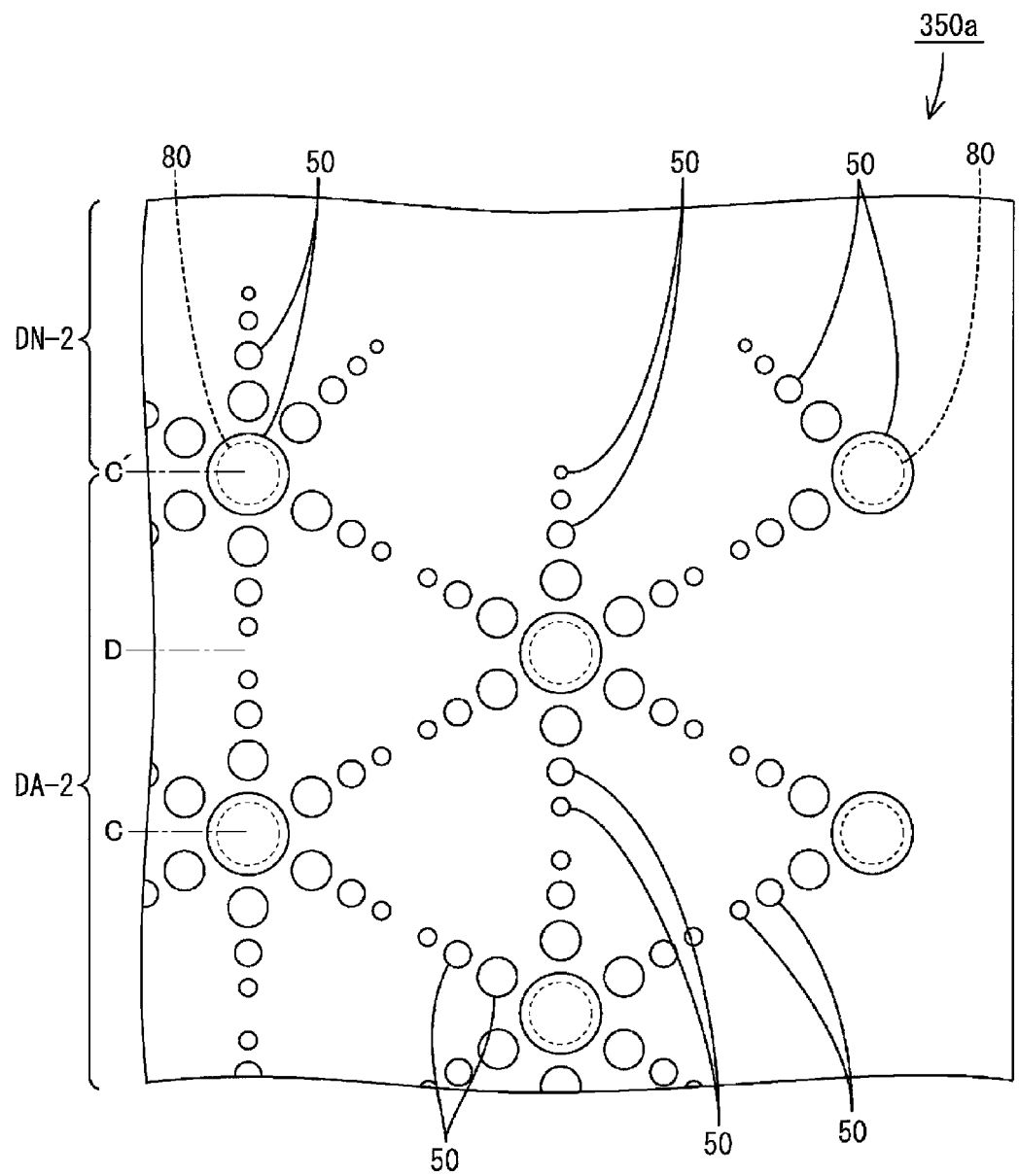
FIG. 26 is a typical view illustrating an arrangement pattern of the light reflecting portion formed on a surface of the diffuser provided in the liquid crystal display device in FIG. 24 that faces the LED light sources.
Figure 27:
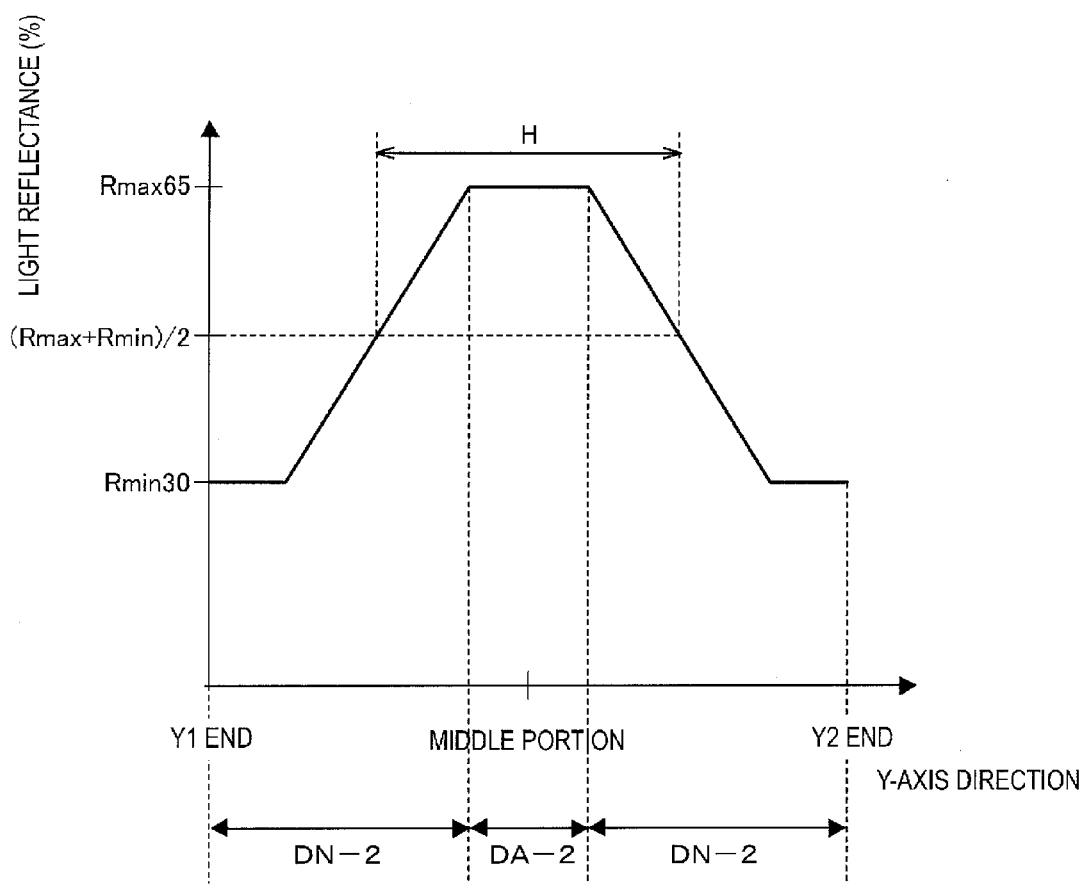
FIG. 27 is a graph illustrating light reflectance in the short-side direction of the diffuser.

FIG. 24 is an exploded perspective view illustrating a general construction of a liquid crystal display device. FIG. 25 is a general plan view illustrating a chassis and an arrangement pattern of LED light sources. FIG. 26 is a typical view illustrating an arrangement pattern of a light reflecting portion formed on a diffuser on a surface facing the LED light sources. FIG. 27 is a graph illustrating a reflectance change in a short-side direction of the diffuser. In FIG. 27, a horizontal axis shows the Y-axis direction (short-side direction) and the light reflectance is plotted on a graph from an end close to Y1 side (Y1 end) toward a middle portion and from the middle portion toward an end close to Y2 side (Y2 end) in the Y-axis direction.

An LED board 81 on which LED light sources (light sources) 80 are mounted is disposed on an inner surface side of the bottom plate 33 of the chassis 14, as illustrated in FIG. 24. The LED board 81 includes a light reflecting sheet 82 and a plurality of LED light sources 80. The light reflecting sheet 82 is disposed on a light exit side surface of the LED board 81 that is a surface facing a diffuser 350a. The LED light sources 80 are arranged to be exposed from openings (not shown) formed in the light reflecting sheet 82. A periphery of the opening is a part of the reflecting sheet 82. As illustrated in FIG. 25, the LED light sources 80 are arranged in lines along the long-side direction of the bottom plate 33 of the chassis 14. The LED board 81 is formed of one plate corresponding to the liquid crystal panel 11 in the present embodiment. However, the LED board 81 may be divided into several pieces and the divided pieces of LED boards 81 may be arranged on a plane surface.

The light reflecting sheet 82 provided on the LED board 81 is a synthetic resin sheet having a surface in white color that provides high light reflectivity. It is placed so as to cover almost entire surface of the LED board 81 excluding the portions in which the LED light sources 80 are arranged.

Each LED light source 80 emits white light. Each LED light source 80 may have three LED chips (not shown) each of which emits light of single color of red, green and blue or may have a blue LED chip and a yellow phosphor. As illustrated in FIG. 25, the LED light sources 80 are arranged in a middle portion 33C of a bottom plate 33 of the chassis 14 and a light source installation area LA-2 is formed in the middle portion 33C. A first end portion 33A and a second end portion 33B of the bottom plate 33 are empty areas LN-2 in which no LED light source 80 is arranged. The LED light sources 80 are arranged on a plane surface in a hexagonal close-packed arrangement. Therefore, each interval between the adjacent LED light sources 80, 80 is equal.

As illustrated in FIG. 26, the light reflecting portion 50 that is configured by a dot pattern is formed on the diffuser 350a on a surface facing the LED light sources 80. The dot pattern is formed by printing paste containing metal oxide (such as titanium oxide) on the surface of the diffuser 350a. In the light source overlapping portions DA-2 of the diffuser 350a that overlap the light source installation area LA-2, the light reflecting portion 50 is formed by forming each dot all over the entire area of each portion that overlaps the LED light source (indicated by C and C' in FIG. 26). Further, the light reflecting portion 50 is also formed on portions of the diffuser 350a that are located between the portions overlapping the LED light sources 80 and the area of each dot continuously reduces in a direction away from the portion overlapping the LED light source 80. In a portion of the diffuser 350a furthest from the portion overlapping the LED light source 80, that is, a portion that overlaps a middle portion between the adjacent LED light sources 80, 80 (indicated by D in FIG. 26), a dot area of the light reflecting portion 50 is smallest. In the empty area overlapping portion DN-2 of the diffuser 350a that overlaps the empty area LN-2, an area of each dot of the light reflecting portion 50 decreases in a continuous manner from a portion close to the light source overlapping portion DA-2 toward a portion further away therefrom. As illustrated in FIG. 27, the light reflectance of an entire area of the diffuser 350a is highest in the light source overlapping portion DA-2, and the light reflectance decreases in the empty area overlapping portions DN-2 in a continuous manner as is further away from the light source overlapping portion DA-2. In the present embodiment, the diffuser 350a has highest light reflectance in the light source overlapping portion DA-2 and the maximum light reflectance Rmax is 65%. Further, in the light reflectance distribution of the diffuser 350a, a percentage of the length of the entire half-value width H that is obtained by (Rmax+Rmin)/2 occupying in the short-side direction (a direction in which the light reflectance of the diffuser 350a changes) width of the transmission area TA of the diffuser 350a is 60%.

With such a configuration, light emitted from the LED light source 80 first reaches the light source overlapping portion DA-2 of the diffuser 350a that is the portion having the light reflecting portion 50 thereon and having high light reflectance. Therefore, most of the light reflects off the light source overlapping portion DA-2, and the brightness of illumination light is suppressed with respect to the light emission amount from the LED light source 80. On the other hand, the light that reflects off the light source overlapping portion DA-2 is reflected in the chassis 14 again and the light may reach the empty area overlapping portion DN-2. The light reflectance of the empty area overlapping portion DN-2 is relatively low and a larger amount of light passes through the empty area overlapping portion DN-2 and thus predetermined brightness of illumination light is achieved. Thus, the light source installation area LA-2 is provided in a portion of the chassis 14 and power saving is achieved and substantially a uniform brightness distribution is achieved in the backlight device 12.

Modification of Third Embodiment

Figure 28:
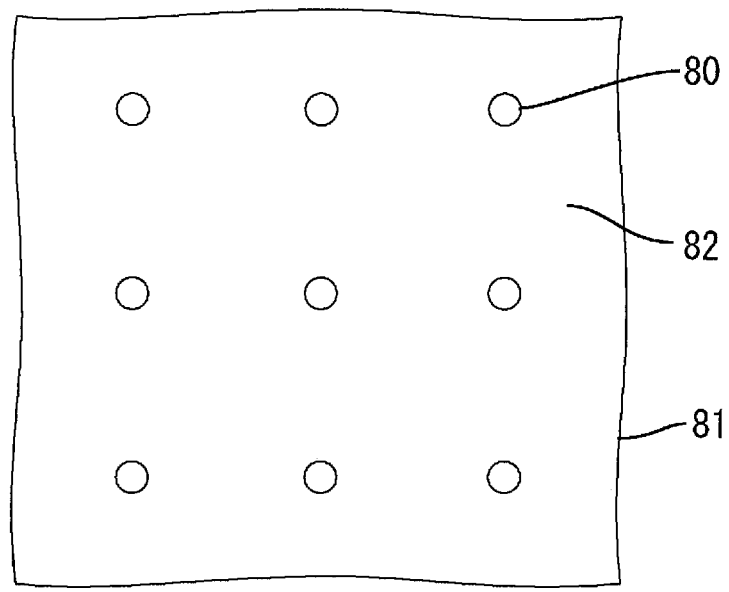
FIG. 28 is a typical view illustrating an arrangement pattern of the LED light sources according to one modification.
Figure 29:
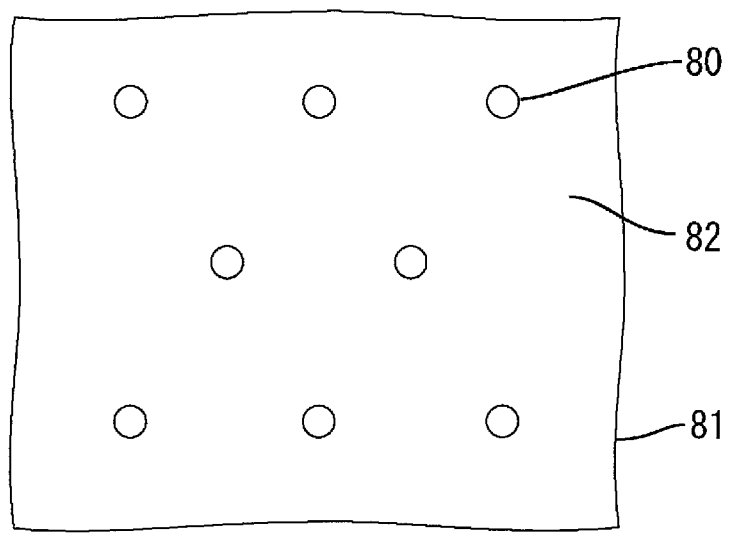
FIG. 29 is a typical view illustrating an arrangement pattern of LED light sources according to another modification.

The LED light sources 80 may be arranged on the LED board 81 as illustrated in FIG. 28 or FIG. 29 according to a modification of the third embodiment. In the third embodiment, the LED light sources 80 are arranged in a hexagonal close-packed arrangement such that the adjacent LED light sources 80 are arranged at equal intervals. However, as illustrated in FIG. 28, the LED light sources 80 may be arranged vertically and horizontally in a grid. Also, as illustrated in FIG. 29, the LED light sources 80 may be arranged vertically and horizontally in a staggered arrangement such that the adjacent LED light sources 80 are offset from each other.

Other Embodiments

The embodiments of the present invention have been described, however, the present invention is not limited to the above embodiments explained in the above description and the drawings. The following embodiments may be included in the technical scope of the present invention, for example.

(1) In the first embodiment, one hot cathode tube is arranged. A plurality of hot cathode tubes may be arranged.

(2) In the second embodiment, six cold cathode tubes are arranged. The number of cold cathode tubes may be altered, if necessary. For example, four or eight cold cathode tubes may be arranged.

(3) In the above embodiments, each dot of the dot pattern of the light reflecting portion is formed in a circular shape. However, the shape of each dot is not limited thereto but may be any shape such as a square or a polygonal shape.

(4) In the above embodiments, the optical sheet set includes a combination of a diffuser, a diffuser sheet, a lens sheet and a reflective polarizing plate. Two diffusers may be layered as optical sheets.

(5) In the above embodiments, the light reflecting portion is formed on a surface of the diffuser that faces the light source. The light reflecting portion may be formed on the diffuser on a surface opposite from the light source.

(6) In the above embodiments, the light source installation area is provided in the middle portion of the bottom plate of the chassis. The light source installation area may be provided in any other positions according to the amount of rays of light from the light source and use conditions of the backlight device. The light source installation area may be provided in end portions of the bottom plate or may be provided in the middle portion and one end portion of the bottom plate.

(7) In the above embodiments, the light source installation area is provided in a portion of the bottom plate of the chassis. The light source installation area may be provided in an entire area of the bottom plate.

The invention claimed is:

1. A lighting device comprising:
a light source;
a chassis configured to house the light source and have an opening for light from the light source to pass through, the chassis including a light source installation area in which the light source is arranged and an empty area in which no light source is arranged;
an optical member provided to face the light source and cover the opening, the optical member including a light source overlapping portion that overlaps the light source installation area and an empty area overlapping portion that overlaps the empty area; and a light reflecting portion provided on at least the light source overlapping portion of the optical member and configured to reflect light from the light source, wherein:

in a light reflectance distribution in a surface area of the optical member, the surface of the optical member has maximum light reflectance Rmax and minimum light reflectance Rmin, and the maximum light reflectance Rmax is 40% or higher in the light source overlapping portion and an entire half-value width H having light reflectance of (Rmax+Rmin)/2 occupies 25% to 80% in a transmission area of the optical member through which the light from the light source transmits.

2. The lighting device according to claim 1, wherein the maximum light reflectance Rmax of the optical member is 65% or higher in the light source overlapping portion.

3. The lighting device according to claim 1, wherein the optical member has a middle portion having the maximum light reflectance Rmax.

4. The lighting device according to claim 1, wherein the light reflecting portion is configured by a dot pattern having light reflectivity.

5. The lighting device according to claim 1, wherein the light reflecting portion includes a material that provides white.

6. The lighting device according to claim 1, wherein the light reflecting portion includes a material that provides one of cyan and blue.

7. The lighting device according to claim 1, wherein the light reflecting portion is configured by mixing a material that provides white and a material that provides one of cyan and blue.

8. The lighting device according to claim 1, wherein the light reflecting portion has light reflectance decreasing in a continuous and gradual manner from a portion having high light reflectance toward a portion having low light reflectance.

9. The lighting device according to claim 1, wherein the light reflecting portion has light reflectance decreasing in a stepwise and gradual manner from a portion having high light reflectance toward a portion having low light reflectance.

10. The lighting device according to claim 1, wherein:

the chassis has a surface facing the optical member and including at least a first end portion, a second end portion, and a middle portion, the second end portion being located at an end away from the first end portion, and the middle portion being located between the first end portion and the second end portion;

at least one of the first end portion, the second end portion and the middle portion is configured as the light source installation area, and the rest is configured as the empty area.

11. The lighting device according to claim 10, wherein in the chassis, the light source installation area is smaller than the empty area.

12. The lighting device according to claim 10, wherein the light source installation area is formed in the middle portion of the chassis.

13. The lighting device according to claim 1, wherein the optical member is a light diffusing member configured to diffuse light from the light source.

14. The lighting device according to claim 1, wherein the optical member is adhered to the light diffusing member that diffuses light emitted from the light source.

15. The lighting device according to claim 1, wherein the optical member is provided on the light diffusing member with thermocompression bonding, the light diffusing member diffusing light emitted from the light source.

16. The lighting device according to claim 1, wherein the light source is a hot cathode tube.

17. The lighting device according to claim 1, wherein the light source is a cold cathode tube.

18. The lighting device according to claim 1, wherein the light source is an LED.

19. A display device comprising:

the lighting device according to claim 1; and a display panel configured to provide display using light from the lighting device for a display device.

20. The display device according to claim 19, wherein the display panel is a liquid crystal display panel using liquid crystal.

21. A television receiver comprising the display device according to claim 19.

* * * * *